(12) United States Patent
Vetter et al.

(10) Patent No.: US 11,709,696 B2
(45) Date of Patent: Jul. 25, 2023

(54) PRELOADING OF VIRTUAL DEVICES IN ANTICIPATION OF A CONNECTION REQUEST FROM A PHYSICAL DEVICE

(71) Applicant: Intelligent Waves LLC, Reston, VA (US)

(72) Inventors: Brian J. Vetter, Austin, TX (US); Phani Achanta, Austin, TX (US)

(73) Assignee: HYPORI, LLC, Reston, VA (US)

(*) Notice: Subject to any disclaimer, the term of this patent is extended or adjusted under 35 U.S.C. 154(b) by 151 days.

(21) Appl. No.: 16/919,041

(22) Filed: Jul. 1, 2020

(65) Prior Publication Data

US 2022/0004413 A1    Jan. 6, 2022

(51) Int. Cl.
*G06F 9/455* (2018.01)
*G06F 9/445* (2018.01)
*G06F 9/451* (2018.01)

(52) U.S. Cl.
CPC ........ *G06F 9/45558* (2013.01); *G06F 9/4451* (2013.01); *G06F 9/452* (2018.02); *G06F 2009/45562* (2013.01); *G06F 2009/45575* (2013.01); *G06F 2009/45595* (2013.01)

(58) Field of Classification Search
CPC .... G06F 9/45558; G06F 9/4451; G06F 9/452; G06F 2009/45562; G06F 2009/45575; G06F 2009/45595
See application file for complete search history.

(56) References Cited

U.S. PATENT DOCUMENTS

| | | |
|---|---|---|
| 10,037,386 B1 | 7/2018 | Esam |
| 11,038,951 B1 | 6/2021 | Baron |
| 2008/0222375 A1 | 9/2008 | Kotsovinos |
| 2010/0094891 A1* | 4/2010 | Noyes ............... G06F 16/951 707/759 |
| 2012/0011509 A1 | 1/2012 | Husain |
| 2012/0131591 A1 | 5/2012 | Moorthi et al. |
| 2012/0167094 A1 | 6/2012 | Suit |
| 2013/0024680 A1* | 1/2013 | Heidingsfeld ...... G06F 16/1767 713/2 |
| 2013/0073670 A1 | 3/2013 | Das et al. |
| 2014/0019970 A1 | 1/2014 | Okamoto |

(Continued)

OTHER PUBLICATIONS

International Search Report and Written Opinion issued in corresponding PCi Patent Application No. PCT/US2021/040153, dated Oct. 28, 2021.

(Continued)

*Primary Examiner* — Dong U Kim

(74) *Attorney, Agent, or Firm* — Pillsbury Winthrop Shaw Pittman, LLP

(57) ABSTRACT

Latency experienced by a user of a client device may be reduced by preloading virtual devices in anticipation of a connection request from the client device. For example, a plurality of virtual devices may be partially loaded prior to a connection request from a client device. In response to the connection request from the client device, a user associated with the client device may be identified and user profile information associated with the user may be retrieved. Based on the retrieved user profile information associated with the user, a virtual device, from among the plurality of preloaded virtual devices, may be loaded, such that the loading of the virtual device is complete and is specific to the user of the client device.

20 Claims, 12 Drawing Sheets

(56) References Cited

U.S. PATENT DOCUMENTS

| | | |
|---|---|---|
| 2014/0143426 A1 | 5/2014 | Yamashita |
| 2014/0258446 A1* | 9/2014 | Bursell .............. H04L 41/0816 709/217 |
| 2015/0055483 A1 | 2/2015 | Lee et al. |
| 2015/0113533 A1 | 4/2015 | Hui et al. |
| 2015/0288619 A1 | 10/2015 | Fritsch |
| 2016/0020987 A1 | 1/2016 | Wetterwald |
| 2016/0088066 A1 | 3/2016 | Thomas |
| 2019/0014102 A1 | 1/2019 | Mathew et al. |
| 2019/0354384 A1* | 11/2019 | Huang .................... G06F 9/542 |
| 2019/0370095 A1* | 12/2019 | Chen ....................... G06F 9/546 |
| 2020/0145385 A1 | 5/2020 | Chauhan et al. |
| 2020/0151621 A1* | 5/2020 | Garcia Delgado . G06F 16/9537 |
| 2020/0351900 A1 | 11/2020 | Zhang |
| 2020/0409761 A1 | 12/2020 | Stuntebeck |
| 2021/0227048 A1 | 7/2021 | Raman |
| 2021/0368023 A1 | 11/2021 | Yan |
| 2022/0004413 A1 | 1/2022 | Vetter |
| 2022/0004414 A1 | 1/2022 | Vetter |
| 2022/0004415 A1 | 1/2022 | Vetter |

OTHER PUBLICATIONS

U.S. Office Action issued in corresponding U.S. Appl. No. 16/919,061, dated May 26, 2022.

Office Action issued in corresponding U.S. Appl. No. 16/919,050, dated Sep. 23, 2022.

Machida et al. "Just-in-Time Server Provisioning using Virtual Machine Standby and Request Prediction;" Published Jun. 2008 (9 pages).

Office Action issued in corresponding U.S. Appl. No. 16/919,061, dated Dec. 15, 2022.

International Preliminary Report on Patentability, issued in related International Application No. PCT/US2021/040153, dated Jan. 12, 2023.

* cited by examiner

PRELOADING OF VIRTUAL DEVICES IN ANTICIPATION OF A CONNECTION REQUEST FROM A PHYSICAL DEVICE

FIELD OF THE INVENTION

The invention relates to facilitating reduction in latency experienced by a user of a physical device, including, for example, by preloading (e.g., partially loading) a plurality of virtual devices in anticipation of a connection request from the physical device.

BACKGROUND OF THE INVENTION

A user attempting to access information/content associated with a virtual device from a physical device may experience latency due to the time it takes to process information/content associated with the virtual device, load the virtual device, and communicate the information/content associated with the virtual device to the physical device. Methods are needed to reduce such latency experienced by users of physical devices. These and other drawbacks exist.

SUMMARY OF THE INVENTION

Aspects of the invention relate to methods, apparatuses, and/or systems for facilitating reduction in latency perceived or experienced by a user of a physical device.

One aspect of the disclosure relates to a system and/or method for facilitating reduction in latency experienced by a user of a physical device by preloading virtual devices in anticipation of a connection request from the physical device. In some embodiments, the system may comprise a virtual device platform including circuitry. In some embodiments, the system may preload (e.g., partially load) a plurality of virtual devices. For example, the plurality of virtual devices may remain partially loaded prior to a connection request from a physical device. The system may obtain a connection request from the physical device, for example, via a network. In response to the connection request, the system may identify a user associated with the physical device and may retrieve user profile information associated with the user. In some embodiments, the system may load a first virtual device from the plurality of virtual devices based on the user profile information associated with the user, such that the loading of the first virtual device is complete and specific to the user. In some embodiments, the loading may also include loading a first virtual device user interface specific to the user. The system may send information associated with the first virtual device user interface to the physical device. In some embodiments, the physical device may present the first virtual device user interface via a display.

Another aspect of the disclosure relates to a system and/or method for facilitating predictive loading of a virtual device in anticipation of a connection request from a physical device. In some embodiments, the system may comprise a virtual device platform including circuitry. The system may predict first and second times at which first and second physical devices will connect to the virtual device platform. For example, the times may be predicted based on connection patterns associated with the physical devices. In some embodiments, the system may retrieve first and second user profile information associated with a first user of the first physical device and a second user of the second physical device, respectively. The system may load a first virtual device specific to the first user and a second virtual device specific to the second user. For example, the loading may be based on the first and second user profile information, respectively. The system may cause the first and second virtual devices to be accessed by the first and second physical devices, respectively, in response to connection requests from the first and second physical devices.

Another aspect of the disclosure relates to a system and/or method for facilitating reduction of latency experienced by a user of a physical device by determining latencies associated with a plurality of virtual device platforms. In some embodiments, the system may include circuitry. For example, the system may determine a latency associated with each of a plurality of virtual device platforms. In some embodiments, the latency may be a network latency between a physical device and each of the plurality of virtual device platforms. The system may select a first virtual device platform for connecting to the physical device from among the plurality of virtual device platforms. For example, the first virtual device platform may have the lowest latency from among the plurality of virtual device platforms. If the system determines that the first virtual device platform does not include user profile information associated with a user of the physical device, the system may identify a second virtual device platform that includes the user profile information. In some embodiments, the system may cause the second virtual device platform to transfer the user profile information to the first virtual device platform. In some embodiments, the system may cause the first virtual device platform to load a virtual device associated with the physical device based on the user profile information.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
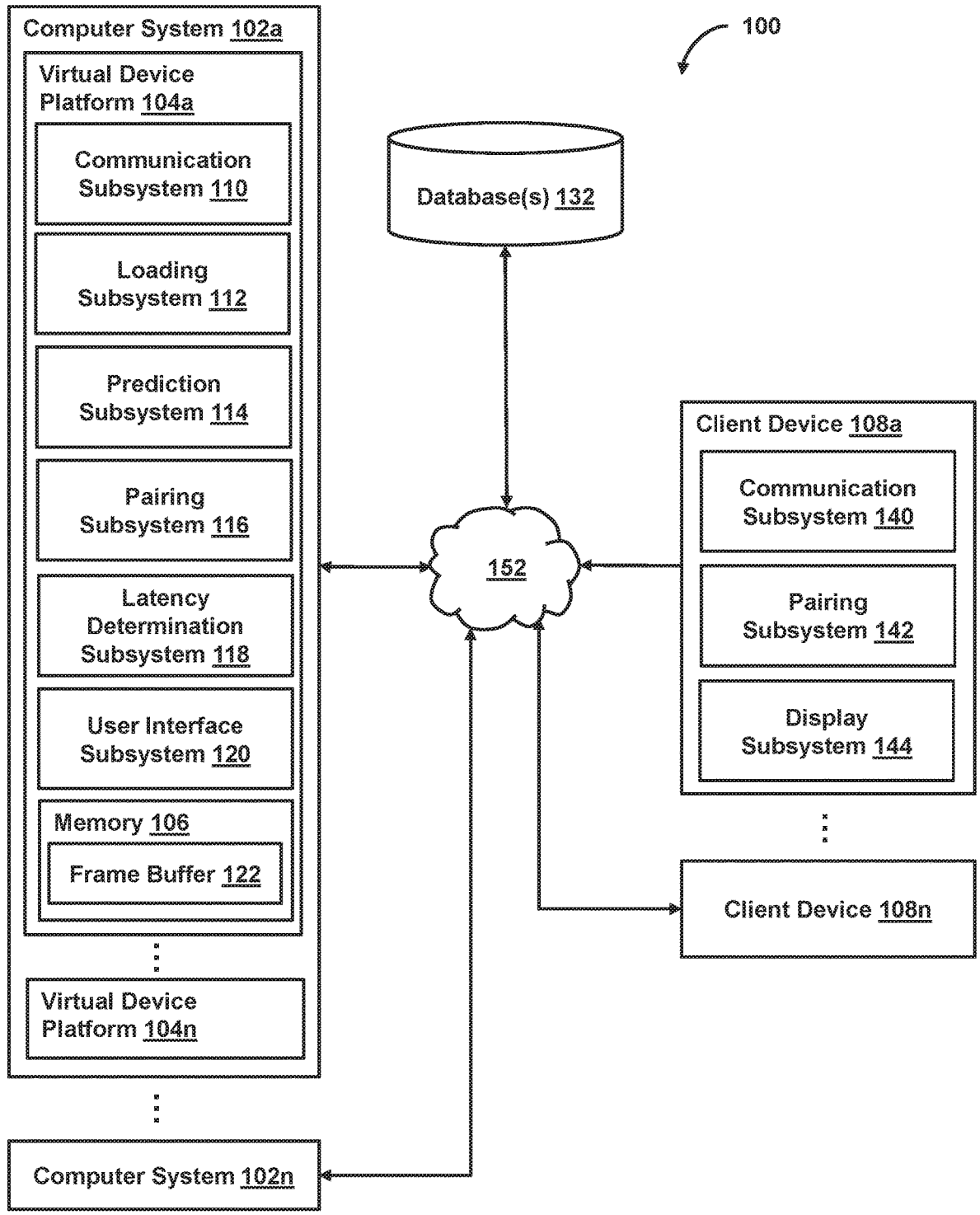
FIG. 1 shows a system for facilitating reduction in latency experienced by a user of a physical device connecting to a virtual device platform, in accordance with one or more embodiments.

FIG. 1 shows a system 100 for facilitating reduction in latency experienced by a user of a physical device connecting to a virtual device platform, in accordance with one or more embodiments. When a physical device connects to a virtual device platform, a virtual device may be loaded with information or content associated with the physical device. With current methods, a user of the physical device may experience latency due to the time it takes to process information or content associated with the virtual device, load the virtual device, or communicate the information or content associated with the virtual device to the physical device. Various methods described herein may reduce latency experienced by the user of the physical device by introducing efficient preloading and loading techniques, as well as by selecting a virtual device platform with lower latency.

For instance, the system 100 may facilitate preloading (e.g., partially loading) of virtual devices in anticipation of a connection request from a physical device, may load one or more of the preloaded virtual devices such that the loading of such virtual devices is completed in response to a connection request from the physical device, and may send information associated with the loaded virtual device to the physical device in response to a connection request from the physical device. Since the amount of loading of a virtual device that must be done in response to, for example, a connection request from the physical device is reduced, the user of the physical device may experience reduced latency when connecting to a virtual device. Further, for instance, the system 100 may facilitate predictively loading of a virtual device (based on connection patterns associated with a physical device) and may send information associated with the loaded virtual device in response to a connection request from the physical device. Since the virtual device is predictively loaded prior to a connection request from a physical device, the user of the physical device may experience reduced latency when connecting to a virtual device. Additionally, for instance, the system 100 may facilitate determining latencies associated with a plurality of virtual device platforms and causing a virtual device to be loaded on a virtual device platform with a lowest latency. Accordingly, since the virtual device platform with a lowest latency may be selected to load a virtual device, latency experienced by a user of a physical device may be reduced when connecting to a virtual device.

As shown in FIG. 1, system 100 may include computer system 102a (e.g., one or more servers) ((or computer systems 102a-102n), client device 108a (or client devices 108a-108n), database 132, or other components. Computer system 102a may include a virtual device platform 104a (or a plurality of virtual device platforms 104a-104n) including communication subsystem 110, loading subsystem 112, prediction subsystem 114, pairing subsystem 116, latency determination subsystem 118, user interface subsystem 120, memory 106 (including frame buffer 122), or other components. Client device 108a (also referred to as a physical device, a physical client device, a user device, or device) may include communication subsystem 140, pairing subsystem 142, display subsystem 144, or other components. Each client device 108a may include any type of mobile terminal, fixed terminal, or other device. By way of example, client device 108a may include a desktop computer, a notebook computer, a tablet computer, a smartphone, a wearable device, or other physical client device. The computer system 102a may include a plurality of virtual platforms 104a-104n that may be co-located or may be located in different geographical locations. The system 100 may include a plurality of computer systems 102a-102n (which includes one or more virtual device platforms 104a-104n) that may be co-located or may be located in different geographical locations.

In some embodiments, a virtual device platform 104a provides a hosted, networked, application environment. A virtual device platform 104a may include one or more servers. A virtual device (e.g., booted on, loaded by, or hosted on a virtual device platform 104a) may be a remote execution environment for the services and applications that make up a device. Each virtual device may thus be a remote execution environment for the services and applications that make up a client device 108a and thus a virtual device may function similarly to a physical client device 108a except that the operating system, data and applications reside and run on a computer system 102a (e.g., one or more servers) or a virtual device platform 104a. Virtual devices may thus include virtual applications, such as browsers, emails, games, productivity applications, or other applications that execute in the computer system 102a. In one embodiment, computer system 102a (e.g., virtual device platform 104a) may be configured as an Android application environment. In some embodiments, virtual devices platforms 104a-104n hosting Android (or Security Enhancements for Android (SEAndroid)) may be created for each user using Linux's Kernel-based Virtual Machine (KVM) and Quick EMUlator (QEMU). In some embodiments, a client device 108a may be associated with one virtual device or a plurality of virtual devices. In some embodiments, a virtual device may be associated with one client device 108a or a plurality of client devices. In some embodiments, a virtual device platform 104a may be associated with one virtual device or a plurality of virtual devices.

Users may utilize one or more client devices 108a-108n to interact with one another, one or more computer systems 102a-102n, or other components of system 100. It should be noted that, while one or more operations are described herein as being performed by components of computer system 102a, those operations may, in some embodiments, be performed by components of client device 108a or other components of system 100 and while one or more operations are described herein as being performed by components of client device 108a, those operations may, in some embodiments, be performed by components of computer systems 102a-102n or other components of system 100. In the present disclosure, a user interface associated with a virtual device (e.g., a user interface associated with a virtual device operating system running on (or hosted by) the virtual device or of a virtual application running on (or hosted by) the virtual device) may be referred to as a virtual device user interface (UI) and a user interface associated with a client device 108a (e.g., a user interface associated with an operating system running on (or hosted by) the client device 108a or of a virtual application running on (or hosted by) the client device 108a) may be referred to as a client device user interface (UI).

In some embodiments, client applications running on (or hosted by) the client device 108a may be accessed via a client device UI. In some embodiments, a client application (or a plurality of client applications) may be associated with a virtual device. Such a client application may be accessed via a client device UI and may render (e.g., via display subsystem 144) information associated with a virtual device UI via a display of the client device 108a. In other words, a virtual device UI (or a portion of the virtual device UI) may be accessed and displayed via a client application running on (or hosted by) the client device 108a. In some embodiments, the client applications may correspond to an email application, browser application, or any other application supported by a physical client device 108a (e.g., a mobile device, a tablet, or a desktop computer).

In some embodiments, in response to a selection of a client application associated with a virtual device (e.g., via a client device UI displayed via a display of the client device 108a), the client device 108a may communicate with the virtual device platform 104a to obtain a virtual device UI associated with a virtual device, and the display subsystem 144 may display the virtual device UI via a display of the client device 108a. In other words, a selection of a client application associated with the virtual device allows a virtual device UI to be accessed via a display of the client device 108a. The virtual device UI may include a plurality of information/content (e.g., icons, audio, video, etc.) relating to applications (e.g., virtual applications) that run on (or are hosted by) the virtual device platform 104a (or computer system 102a). The virtual applications may correspond to an email application, browser application, word application, excel application, audio application, video application, or any other application supported by, for example, a physical client device 108a. Since the virtual applications are accessible via the client device 108a and are hosted by the virtual device platform 104a (or computer system 102a), the data associated with the virtual applications may be stored in the virtual device platform 104a (or computer system 102a). For example, memory 106 or database 132 (or another database (not shown) within the computer system 102a or virtual device platform 104a) may store the data associated with the virtual applications. Although database 132 is illustrated as being separate from the computer system 102a and virtual device platform 104a in FIG. 1, it should be understood that database 132 may be included within the computer system 102a or virtual device platform 104a. The data associated with the virtual applications may include data associated with emails, documents, or other confidential information. Since data (e.g., confidential information) may be stored outside of the client device 108a, malicious actors may not be able to gain access to such data simply by gaining access to the client device 108a.

In some embodiments, one or more virtual applications may be accessed via a client application hosted on the client device 108a. For example, a virtual application may be accessed via a virtual device UI displayed via a display screen of the client device 108a. The user interface subsystem 120 of the virtual device platform 104a may generate (or retrieve) a virtual device UI (or a portion of the virtual device UI) and the communication subsystem 110 of the virtual device platform 104a may send information associated with the virtual device UI to the client device 108a (e.g., communication subsystem 140 of the client device 108a may obtain the information associated with the virtual device UI). The user interface subsystem 120 may send information associated with the virtual device UI to a client device in response to a selection of the client application associated with the virtual device, in response to a communication from the client device 108a indicating the selection (via the client device 108a) of the client application associated with the virtual device, or in response to a connection between the client device 108a and the virtual device. The information associated with the virtual device UI may include an image of the virtual device UI or a video (e.g., a stream of h264 encoded video) associated with the virtual device UI.

The information associated the virtual device UI may be sent to the client device 108a in response to a request from the client device 108a or in response to a connection between the client device 108a and the virtual device. For example, in response to a user selection of a client application running or hosted on the client device 108a, the client application may send an application programming interface (API) request to the computer system 102a in order to obtain the information associated with the virtual device UI. The client application may recognize the identity of a user accessing the client application on the client device 108a and the client device 108a (via the client application) may send a request for a virtual device UI associated with the identified user. Alternatively, the client application may request a user to enter his/her user credentials (e.g., a username and password combination, biometrics, etc.) and in response to proper identification, the client application may render the virtual device UI specific to the user via a display screen of the client device 108a. Different users or client devices 108a may be associated with different virtual device UIs. Accordingly, the client application may connect to one or more virtual devices and may render a plurality of virtual device UIs based on, for example, identification of users associated with the client device 108a or identification of the client device 108a.

In some embodiments, prior to establishing normal communication between a client device 108a and computer system 102a (e.g., virtual device platform 104a), the client device 108a and the virtual device platform 104a may perform a handshake, during which information may be exchanged between the client device 108a and the computer system 102a. The exchanged information may establish the protocols of a communication link at the start of the communication between the client device 108a and the computer system 102a and prior to establishing normal communication between the client device 108a and computer system 102a. Handshaking can negotiate parameters that are acceptable to equipment and systems at both ends of the communication channel (e.g., at both the client device 108a and the computer system 102a), including information transfer rate, coding alphabet, parity, interrupt procedure, and other protocol or hardware features. In some embodiments, the handshaking process may also include exchange of display configuration information. In other words, during the handshaking process, the client device 108a (e.g., display subsystem 144) may retrieve (e.g., from a memory of the client device 108a) display configuration information associated with the client device and the computer system 102a (e.g., communication subsystem 110) may obtain such display configuration from the client device 108a (e.g., communication subsystem 140) information via a network connection (e.g., network 152). Alternatively, the display configuration information may be retrieved (e.g., from a memory of the client device 108a) by the client device 108a after the handshaking process, and the computer system 102a (e.g., communication subsystem 110) may obtain such display configuration information from the client device 108a (e.g., communication subsystem 140) via a network connection (e.g., network 152).

However, a user of a physical device (e.g., client device 108a), which is connected with or communicating with a virtual device, may perceive latency. In some embodiments, latency may be processing latency, due to the time it takes a system (e.g., computer system 102a, client device 108a, etc.) to process data (e.g., user profile information, device profile information, user interface information, or other data). In some embodiments, latency may be networking latency, due to the time it takes a physical device 108a to receive data (e.g., information related to virtual device user interfaces, requests for information or connection, or other data) from a virtual device platform 104a over a network. In some embodiments, other types of latency may exist in a system. A system (e.g., computer system 102a) may reduce the latency of the system in a number of ways.

For example, system 100 (e.g., computer system 102a, virtual device platform 104a) may preload virtual devices in anticipation of a connection request from a physical device. For example, when the computer system 102a obtains a connection request, the computer system 102a may load one or more of the preloaded virtual devices such that the loading of such virtual devices is complete and may send information associated with the virtual device (or a virtual device user interface) to the physical device (e.g., client device 108a). Accordingly, the latency experienced by a user of a physical device may be reduced by reducing the amount of loading of a virtual device that must be done in response to, for example, the connection request from the physical device.

System 100 may, additionally or alternatively, predictively load a virtual device in anticipation of a connection request from a physical device. For example, based on connection patterns associated with one or more physical devices, computer system 102a may predict a time at which a physical device (e.g., client device 108a) will connect to a virtual device platform 104a and prior to the predicted time, computer system 102a may load a virtual device associated with client device 108a. Accordingly, the latency experienced by the user of the physical device may be reduced by predictively loading a virtual device associated with client device 108a before client device 108a connects to the virtual device platform 104a.

System 100 may, additionally or alternatively, determine latencies associated with each of a plurality of virtual device platforms 104a-104n and select a virtual device platform with the lowest latency out of a plurality of virtual device platforms. In some embodiments, computer system 102a may determine a latency (or predicted latency) associated with a plurality of virtual device platforms. In some embodiments, the latency may be a processing latency, a network latency, another type of latency, or any combination therein. The latency may be calculated with respect to a location (or predicted location) of a physical device (e.g., client device 108a). Computer system 102a may cause the virtual device platform associated with, for example, the lowest latency to load a virtual device associated with client device 108a. Accordingly, the latency experienced by a user of a physical device may be reduced by determining latencies associated with a plurality of virtual device platforms and causing a virtual device to be loaded on a virtual device platform with, for example, a lowest latency.

These methods may be used individually or in conjunction with each other and with any other methods for reducing latency experienced by a user of a physical device connecting to a virtual device platform. For example, in some embodiments, system 100 may preload (e.g., partially load) a plurality of virtual devices, may predict a time at which one or more physical devices will request to connect to a virtual device platform, and/or may determine a latency associated with each of a plurality of virtual device platforms (e.g., the latency associated with each of the plurality of virtual device platforms may be based on a predicted location of a physical device, processing delay of each of the virtual device platforms, and/or network delays associated with each of the virtual device platforms). System 100 may preload (e.g., partially load) one or more virtual devices at a virtual device platform associated with a low latency and/or may preload (e.g., a partially load) one or more virtual devices at a time prior to the predicted time. System 100 may, in response to a connection request from a physical device, based on the predicted time that the physical device will request to connect to a virtual device platform and/or based on a determination that a first virtual device platform (e.g., associated with a low latency from among the plurality of virtual device platforms) does not have user profile information, retrieve user profile information associated with a user of the physical device. System 100 may load a virtual device (e.g., from one or more preloaded virtual devices) based on the user profile information (e.g., such that the loading of the virtual device is complete and is specific to the user of the client device and/or such that the loading of the virtual device is performed at a predetermined amount of time prior to the predicted time). For example, system 100 may cause a virtual device platform that is associated with a low latency to load the virtual device (e.g., from one or more preloaded virtual devices) based on the user profile information. In other words, system 100 may determine a latency associated with each of the plurality of virtual device platforms and may select a virtual device platform (from among the plurality of virtual device platforms) to cause such a virtual device platform to load the virtual device (e.g., from one or more preloaded virtual devices) based on the user profile information (e.g., which may be retrieved from another virtual device platform in response to a determination that a virtual device platform does not have the user profile information). Other examples may likewise use the methods described herein in conjunction with each other or with any other methods for reducing latency experienced by a user of a physical device connecting to a virtual device platform.

Preloading Virtual Devices in Anticipation of a Connection Request from a Physical Device In some embodiments, loading subsystem 112 may preload (e.g., partially load) a plurality of virtual devices (e.g., a plurality of operating systems and applications and data associated with virtual devices) on one or more virtual device platforms 104a-104n in anticipation of connection requests from one or more physical devices (e.g., client devices 108a-108n). In some embodiments, preloading may include preloading the virtual devices to a certain level (e.g., 50% of the way, 93% of the way, etc.). In some embodiments, loading subsystem 112 may preload a plurality of virtual devices (e.g., applications or data associated with a plurality of virtual devices) via a virtual device platform (e.g., virtual device platform 104a). Such preloaded virtual devices may not be associated with user profile information (e.g., information or data associated with or specific to a particular user) or device profile information (e.g., information or data associated with or specific to a particular device). In other words, the preloaded virtual devices may correspond to virtual devices that are not user-specific and/or not device-specific. Thus, the preloaded virtual devices correspond to partially loaded virtual devices. In some embodiments, the user profile information may include information that is specific to a particular user and that may be used to fully load the virtual devices. For example, user profile information may include calendar information associated with the user, accounts associated with the user, personal identifying information, health data associated with the user, contact information associated with the user, payment information associated with the user, connections to external accounts (e.g., cloud accounts) associated with the user, login information (e.g., usernames or passwords) for accounts associated with the user, settings (e.g., preferences or configurations, such as layout view, color themes, preferred languages, data format, message, display format, application settings, network connection settings) associated with devices or accounts of the user, files or directories to which the user has access, or other user profile information. In some embodiments, device profile information may be information such as type, model, storage capacity, software capabilities, hardware capabilities, connectivity, operating system, or other specifications of the physical device 108a.

In some embodiments, a plurality of virtual devices (e.g., which are not specific to a particular user or a particular physical device) may be preloaded (e.g., partially loaded) onto the virtual device platform 104a, such that the preloaded virtual devices are not associated with or specific to a particular user or a particular physical device. For example, settings applications, camera editing applications, clock and alarm applications, web browsing applications, weather applications, and other applications associated with one or more virtual devices may be preloaded (e.g., such that these applications are loaded without any user-specific or device-specific information), while other applications (e.g., email applications, calendar applications, bank applications, contact information, or other user-specific or device-specific applications) associated with one or more virtual devices may not be preloaded. The virtual devices may be preloaded prior to a connection request from one or more physical devices 108.

In some embodiments, however, loading subsystem 112 may partially load certain applications. For example, loading subsystem 112 may partially load certain applications (e.g., load certain information associated with a certain application), such that these applications are not user-specific or device-specific. For example, a weather application may include information that is not user specific (e.g., weather information related to major cities in the world) and information that is user specific (e.g., weather information related to user-specific cities). The weather application may initially be preloaded with such information not specific to a user profile. In this example, the weather application may subsequently be updated based on user profile information (e.g., cities selected by a specific user). In some embodiments, the weather application may be updated upon identifying a user associated with the preloaded virtual device (e.g., upon receiving a connection request from a client device associated with a particular user). In other words, certain applications associated with one or more virtual devices may be partially loaded without user specific information, and upon identifying a user (e.g., upon receiving a connection request from a client device associated with a user), these applications may be updated and loaded to include user-specific information.

Figure 3:
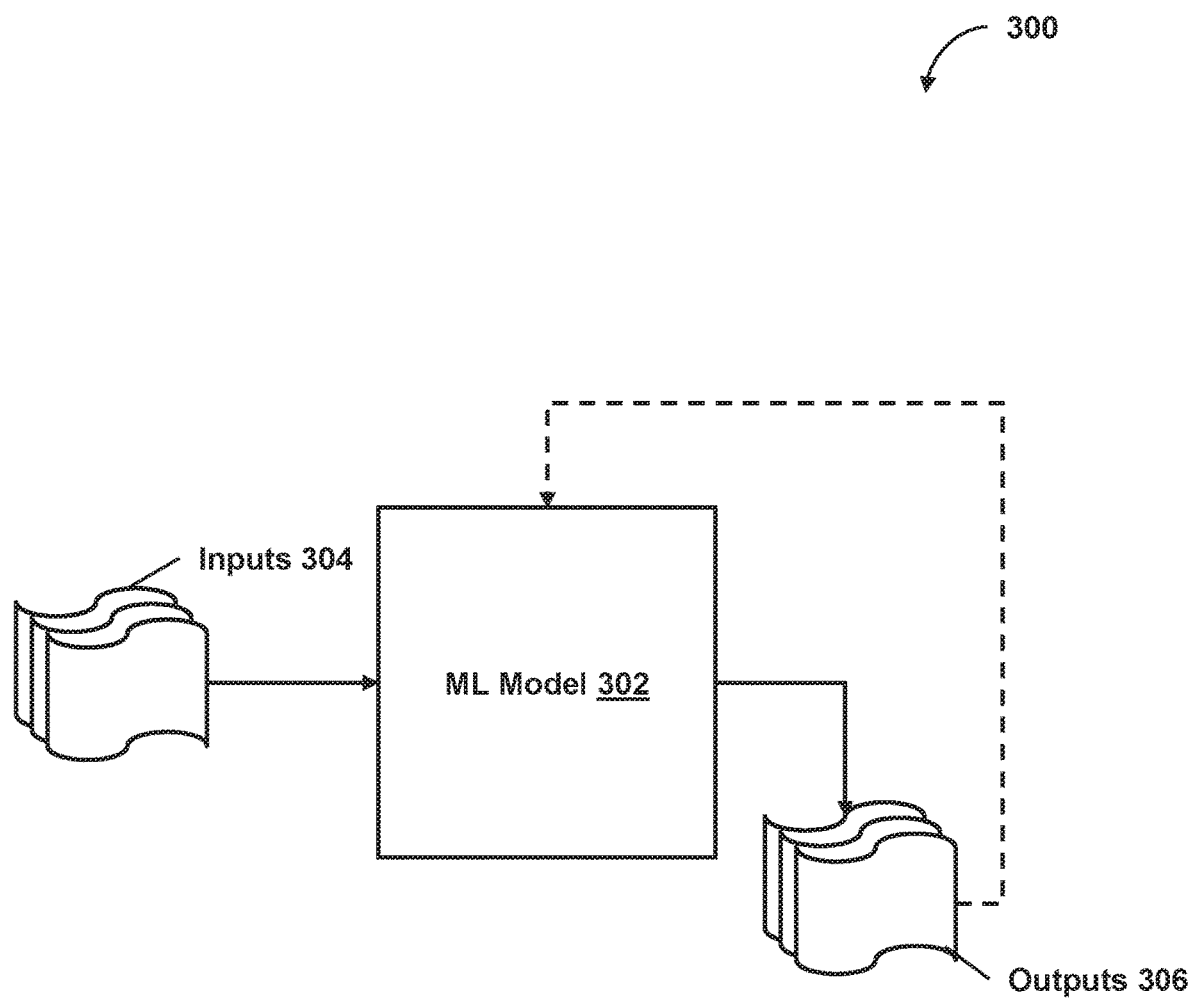
FIG. 3 shows a machine learning model system for making predictions that facilitate reduction in latency experienced by a user of a physical device connecting to a virtual device platform, in accordance with one or more embodiments.

In some embodiments, prediction subsystem 114 may predict an optimal number of virtual devices for preloading. In some embodiments, prediction subsystem 114 may train one or more prediction models (e.g., machine learning models, neural networks, etc.) to facilitate predictions of numbers of virtual devices. As shown in FIG. 3, machine learning model 302 may receive inputs 304 and generate outputs 306. For example, inputs 304 may include a time (e.g., a particular time, hour, day, week, month, year, etc.) at which the virtual device platform 104a received connection requests from physical devices and reference feedback information 306 (which is fed back as input to the machine learning model 302) may include a number of physical devices that sent connection requests to the virtual device platform 104a at such time to train the machine learning model 302. Accordingly, when a particular time is provided as input 304 to the machine learning model 302, the model learning model 302 may provide an output 306 that includes a predicted number of physical devices that are likely to send connection requests to a virtual device platform 104a at that particular time. The predicted number of physical devices may be used to determine a number of virtual devices that will be needed to be preloaded (e.g., at a particular time) to address connection request from physical devices at a particular time. In some embodiments, the predicted number of virtual devices may include a predicted first number (or set) of virtual devices that correspond to a first type of physical device (e.g., a mobile phone), a predicted second number (or set) of virtual devices that correspond to a second type of physical device (e.g., a tablet), and/or a predicted third number (or set) of virtual devices that correspond to a third type of physical device (e.g., a desktop computer). Although three sets of predicted virtual devices are described above, it should be understood that the predicted number of virtual devices may include any number of sets of virtual devices.

In some embodiments, loading subsystem 112 may analyze historic data in order to preload an optimal number of virtual devices. In other words, the loading subsystem 112 may analyze historical data in order to predict an optimal number of virtual devices to be preloaded. For example, loading subsystem 112 may determine a number of virtual devices that have been historically preloaded and how many of those virtual devices were loaded completely and used in connection with a client device (e.g., client device 108*a*). If loading subsystem 112 determines that it has been historically preloading too many virtual devices, loading subsystem 112 may preload fewer virtual devices. This may reduce excess computational resources that are used in the preloading process. If loading subsystem 112 determines that it has been historically preloading too few virtual devices, loading subsystem 112 may preload more virtual devices. This may reduce the latency for a greater number of physical device users who are connecting to the virtual device platform 104*a*. Further, in some embodiments, loading subsystem 112 may analyze historic data in order to preload a plurality of sets of virtual devices. In other words, the loading subsystem 112 may analyze historical data in order to predict a number of sets of virtual devices to be preloaded and an optimal number of virtual devices to be preloaded within each set. For example, loading subsystem 112 may determine a first number (or set) of virtual devices (associated with a first type of client device 108) that have been historically preloaded and how many of those virtual devices were loaded completely and used in connection with a client device (e.g., client device 108*a*), determine a second number (or set) of virtual devices (associated with a second type of client device 108) that have been historically preloaded and how many of those virtual devices were loaded completely and used in connection with a client device (e.g., client device 108*a*), and/or determine a third number (or set) of virtual devices (associated with a third type of client device 108) that have been historically preloaded and how many of those virtual devices were loaded completely and used in connection with a client device (e.g., client device 108*a*). Although three sets of predicted virtual devices are described above, it should be understood that the predicted number of virtual devices may include any number of sets of virtual devices. Predicting an optimal number of virtual devices to be preloaded and preloading such a predicted number of virtual devices is advantageous because it saves computational resources and reduces latency experienced by users of physical devices.

Figure 2A:
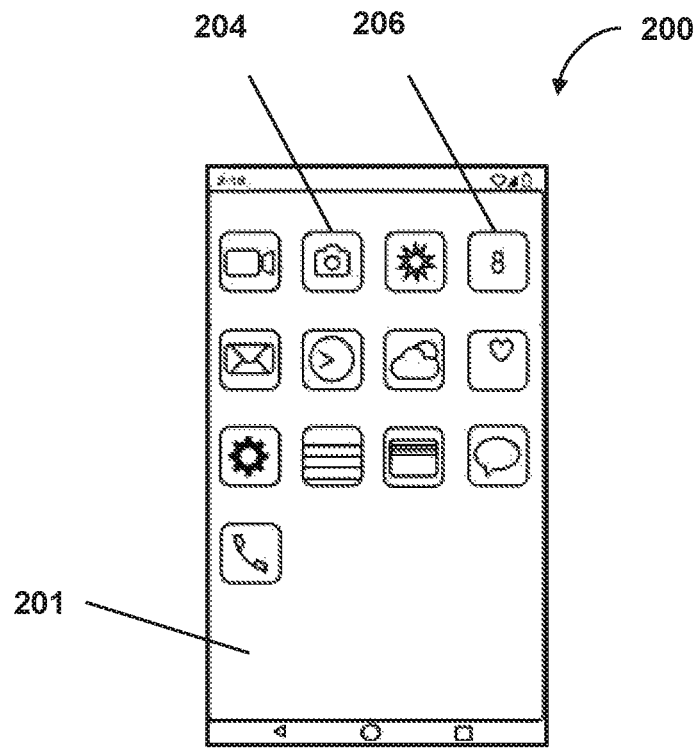
FIG. 2A shows a virtual device user interface of a virtual device in a first state, in accordance with one or more embodiments.

FIG. 2A shows a virtual device user interface 201 of a virtual device in a first state 200, in accordance with one or more embodiments. In some embodiments, virtual device user interface 201 may be associated with a virtual device hosted (or installed or accessed) on a computer system 102*a* (e.g., one or more servers, virtual device platform 104*a*), as shown in FIG. 1. In some embodiments, the virtual device user interface 201 of the virtual device may be in the first state 200, which may correspond to a preloaded state (e.g., a partially loaded state). In other words, certain applications associated with the virtual device user interface 201 of a virtual device may be preloaded (or partially loaded) and certain other applications associated with the virtual device user interface 201 of the virtual device may not be loaded. Such preloading (or partial loading) of some applications and not loading of other applications may correspond to a first state associated with the virtual device user interface 201 of the virtual device. In other words, such preloading (or partial preloading) of some applications and not loading of other applications may correspond to a first state of the virtual device. In other words, a first state (e.g., a partially loaded state) of a virtual device may include some applications that are preloaded (or partially loaded) and other applications that haven't been loaded. It should be understood that the first state 200 (e.g., partially loaded state 200) of the virtual device user interface 201 may include certain applications that are fully loaded (e.g., certain applications that are not associated with user-specific or device-specific information).

The virtual device user interface 201 of the virtual device may be programmed to be a fixed size or resolution. In some embodiments, computer system 102*a* (e.g., one or more servers, virtual device platform 104) may have a capacity to store and load many virtual devices and virtual device user interfaces, such as virtual device user interface 201. For example, one or more virtual device user interfaces such as virtual device user interface 201 may correspond to a single virtual device loaded via the virtual device platform 104*a*.

In some embodiments, the operating system associated with a virtual device may be preloaded and certain applications associated with the virtual device may be preloaded (e.g., without including user specific information). For example, preloading the virtual device may include loading an operating system, loading certain applications that are not user specific, partially loading a virtual device user interface, and/or partially loading certain applications (e.g., an email application) without including user specific information. For example, applications which may be partially loaded may include a video calling application, a camera application, a photo storage application, a calendar application, an email application, an alarm application, a weather application, a health application, a settings application, a notes application, a finances application, a texting application, and a calling application. In some embodiments, these applications may be preloaded such that information associated with the applications is preloaded, excluding user specific information. For example, calendar application 206 may be preloaded with information excluding user specific information. Calendar application 206 may, for example, be preloaded with date information but may exclude calendar events associated with any particular user profile. In this example, the calendar application may subsequently be fully loaded onto virtual device platform 104*a* (e.g., based on user profile information) once a user is identified. In some embodiments, other applications that are not associated with user specific information may be preloaded. For example, a camera application 204 may not include any user specific information and may therefore be preloaded via the virtual device platform 104*a*. Preloading a virtual device may correspond to partially loading the virtual device such that only some applications associated with the virtual device may be loaded or some applications associated with the virtual device may be partially loaded, while other applications may not be loaded.

In some embodiments, the first state 200 may include different levels of preloading depending on an associated client device. For example, one or more first virtual devices (associated with a first type of client device (e.g., a mobile device)) may be preloaded to 50% (e.g., the first virtual device may be loaded 50% of the way) and one or more second virtual devices (associated with a second type of client device (e.g., a tablet)) may be preloaded to 93% (e.g., the second virtual device may be loaded 93% of the way). In this example, each preloaded virtual device may be in the first state.

In some embodiments, one or more versions of virtual device user interfaces may be preloaded. For example, each user may own several physical devices (e.g., cell phone, tablet, laptop, smart television, or other devices). Each of the user's physical devices may have a different resolution, size, dimensions, layout, or interface. Loading subsystem 112 may therefore preload several virtual device user interface varieties of different operating systems, sizes, resolutions, or dimensions. In other words, a plurality of virtual devices that are associated with different virtual device user interface versions may be preloaded. In some embodiments, loading subsystem 112 may preload a plurality of configurations (e.g., a plurality of resolutions, pixel dimensions, or pixel density) for the virtual device user interfaces. The plurality of configurations may correspond to a low resolution (and a low pixel density), a medium resolution (and a medium pixel density), and a high resolution (and a high pixel density) for the virtual device user interfaces. The user may later access these preloaded virtual device user interfaces (e.g., if the user switches physical devices during a session). For example, if the user is accessing a virtual device associated with a first physical device (e.g., cell phone) but switches to a second physical device (e.g., tablet), pairing subsystem 116 may retrieve a preloaded virtual device associated with a virtual device user interface having the correct size, resolution, dimension, or other quality associated with the second physical device. Because a plurality of virtual devices associated with different varieties of the virtual device user interfaces are preloaded, the user may experience decreased latency when switching devices. It should be understood that any number of virtual devices associated with different operating systems, resolutions, dimensions, or other configurations may be preloaded.

Returning to FIG. 1, computer system 102a (e.g., pairing subsystem 116) may receive a connection request from a physical device (e.g., client device 108a). In some embodiments, client device 108a may initiate a connection request when client device 108a powers on. In some embodiments, client device 108a may initiate a connection request by interacting (e.g., a user interaction) with an application (e.g., client application) via client device 108a. Other methods of initiating a connection request may be performed. In some embodiments, the connection request may comprise a request to access a virtual device (e.g., a virtual device user interface as shown in FIG. 2A) via a physical device (e.g., client device 108a).

In some embodiments, computer system 102a (e.g., pairing subsystem 116) may identify a user associated with a client device 108a in response to the connection request. For example, pairing subsystem 116 may retrieve an identity of a user from memory (e.g., memory 106 or database 132) in response to a connection request from a client device 108a. In other words, pairing subsystem 116 may retrieve an identity of a user associated with the client device 108a. In some embodiments, pairing subsystem 116 may retrieve user profile information associated with the identified user from the new physical device or from a database or memory associated with virtual device platform 104a. In some embodiments, the user profile information may be located on client device 108a, associated with client device 108a, computer system 102a, or located elsewhere. In some embodiments, pairing subsystem 116 may additionally or alternatively retrieve device profile information associated with client device 108a (e.g., the client device 108a that sends the connection request to the computer system 102a). For example, the device profile information may include information such as type, model, storage capacity, software capabilities, hardware capabilities, connectivity, operating system, or other specifications of the physical device.

In some embodiments, computer system 102a (e.g., loading subsystem 112) may load a virtual device from the plurality of preloaded virtual devices based on the retrieved user profile information. In other words, the loading subsystem 112 may complete the loading process of a preloaded device (or partially loaded virtual device) based on the retrieved user profile information. For example, a partially loaded virtual device may include applications that are loaded or applications that are partially loaded, while other applications are not loaded. The loading subsystem 112 may continue the loading process of the applications that are partially loaded, such that loading of these applications is complete, based on the retrieved user profile information, and may further load other applications (which have not been previously loaded) based on the retrieved user profile information. The loading subsystem 112 may load certain applications to include user specific information (e.g., based on the retrieved user profile information). As such, the loading subsystem 112 may load a virtual device (which was previously partially loaded) based on the user profile information such that the loading of such a virtual device is complete and is specific to the user of the client device 108a.

In some embodiments, loading subsystem 112 may load the virtual device based on device profile information. For example, loading subsystem 112 may retrieve device profile information associated with the client device 108a and use the device profile information to load the virtual device such that it is compatible with hardware and software capabilities of client device 108a. In some embodiments, loading subsystem 112 may load applications based on the device profile information (e.g., applications specific to a device or a type of device indicated by the device profile information). For example, loading subsystem 112 may determine that client device 108a is an iPhone based on the device profile information and may load the virtual device such that the virtual device is compatible with the client device 108a (e.g., display configuration information associated with a virtual device user interface is compatible with display configuration information associated with the client device 108a). In other words, since different client devices 108a-108n may have different display configurations, hardware configurations, and software configurations, the device profile information of a client device 108a may be used to load a virtual device (from a plurality of preloaded virtual devices), such that the loading of the virtual device is complete and such that the virtual device is compatible with the display configurations, hardware configurations, storage configurations, privacy configurations, and/or software configurations of the client device 108a.

Based on the retrieved user profile information, loading subsystem 112 may continue to load a virtual device (from a plurality preloaded virtual devices) using data (e.g., data that is specific to the user profile information), such that the loading of the virtual device is complete. For example, loading subsystem 112 may load any information associated with the virtual device that was not previously preloaded prior to a connection request from a client device 108a. For example, if applications (associated with a virtual device) not unique to a specific user (e.g., web browsers, camera application 204, weather application, etc.) were previously preloaded, loading subsystem 112 may load applications unique to the specific user (e.g., email applications, health applications, etc.). In some embodiments, loading subsystem 112 may complete the loading process of applications that were previously preloaded or partially loaded. In other words, loading subsystem 112 may retrieve user profile information and based on the user profile information, update applications which have been preloaded (e.g., as described above). For example, if calendar application 206 has been preloaded, loading subsystem 112 may subsequently retrieve the user profile information associated with a specific user and update the calendar application 206 (e.g., such that the calendar application 206 is unique to a specific user), such that the loading of the calendar application 206 is complete.

Figure 2B:
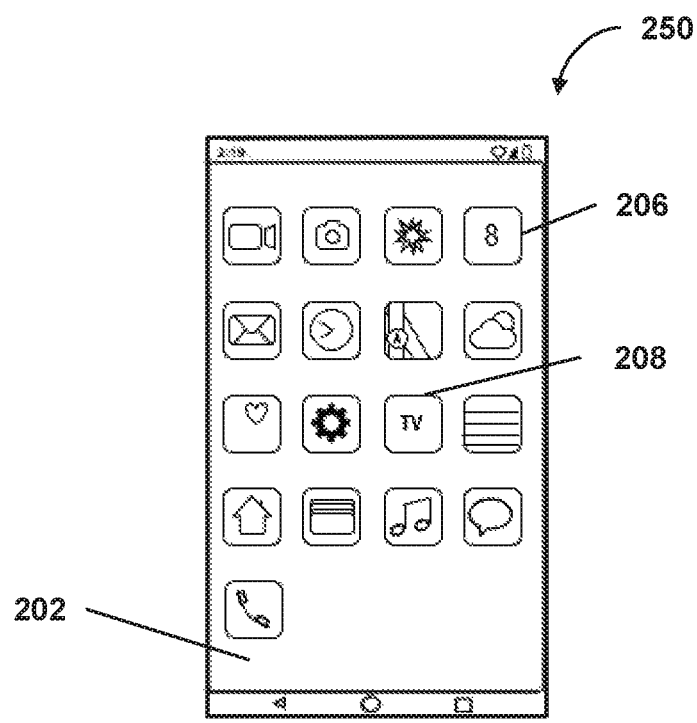
FIG. 2B shows a virtual device user interface of a virtual device in a second state, in accordance with one or more embodiments.

FIG. 2B shows a virtual device user interface 202 of a virtual device in a second state 250, in accordance with one or more embodiments. In some embodiments, a virtual device associated with the virtual device user interface 202 shown in FIG. 2B may correspond to the same virtual device associated with the virtual device user interface 201 shown in FIG. 2A. As shown in FIG. 2B, the virtual device user interface 202 may be fully loaded (e.g., in the second state 250). For example, the virtual device user interface 202 in the second state 250 may include applications that are specific to the user (e.g., applications that have been loaded based on the user profile information) and these applications may or may not have been included in the preloaded state (e.g., the first state 200) of the virtual device user interface 201. For example, a media streaming application 208 may be specific to a user (e.g., the media streaming application 208 may be associated with user's login credentials, subscriptions, downloaded shows and movies, and other user profile information). Media streaming application 208 may therefore be loaded based on user profile information and thus the second state 250 (and not the first state 200) of the virtual device user interface 202 illustrates the streaming application 208. In some embodiments, other applications which were partially loaded in the first state 200 may be completely loaded in the second state 250. For example, calendar application 206 may have been partially loaded in the first state 200 (e.g., without user specific information) and may be completely loaded in the second state 250 (e.g., based on user specific information). In some embodiments, the second state 250 may correspond to a completely loaded state that is specific to the user. In some embodiments, the second state 250 may represent a state which is ready to be communicated to client device 108a.

Although FIGS. 2A and 2B have been illustrated to correspond to a first state 200 and second state 250 associated with a virtual device user interface of a virtual device, it should be understood that preloading a virtual device (e.g., a first state of the virtual device) may include loading of a first state 200 of the virtual device user interface 201 and loading the virtual device such that the loading of the virtual device is complete (e.g., a second state of the virtual device) may include loading of a second state 250 of the virtual device user interface 202. Preloading (or partially loading) a virtual device (e.g., a first state) may include loading an operating system associated with the virtual device, loading applications (associated with the virtual device) that are not specific to a user, partially loading applications (associated with the virtual device) with information that is not specific to a user, and/or partially loading a virtual device user interface (e.g., virtual device user interface 201 in FIG. 2A) and loading the virtual device such that the loading of the virtual device is complete (e.g., a second state) may include completing the loading of the operating system, completing the loading of the partially loaded applications (such that these applications are loaded based on user profile information), and/or completing the loading of a virtual device user interface (e.g., virtual device user interface 202 in FIG. 2B).

Figure 2C:
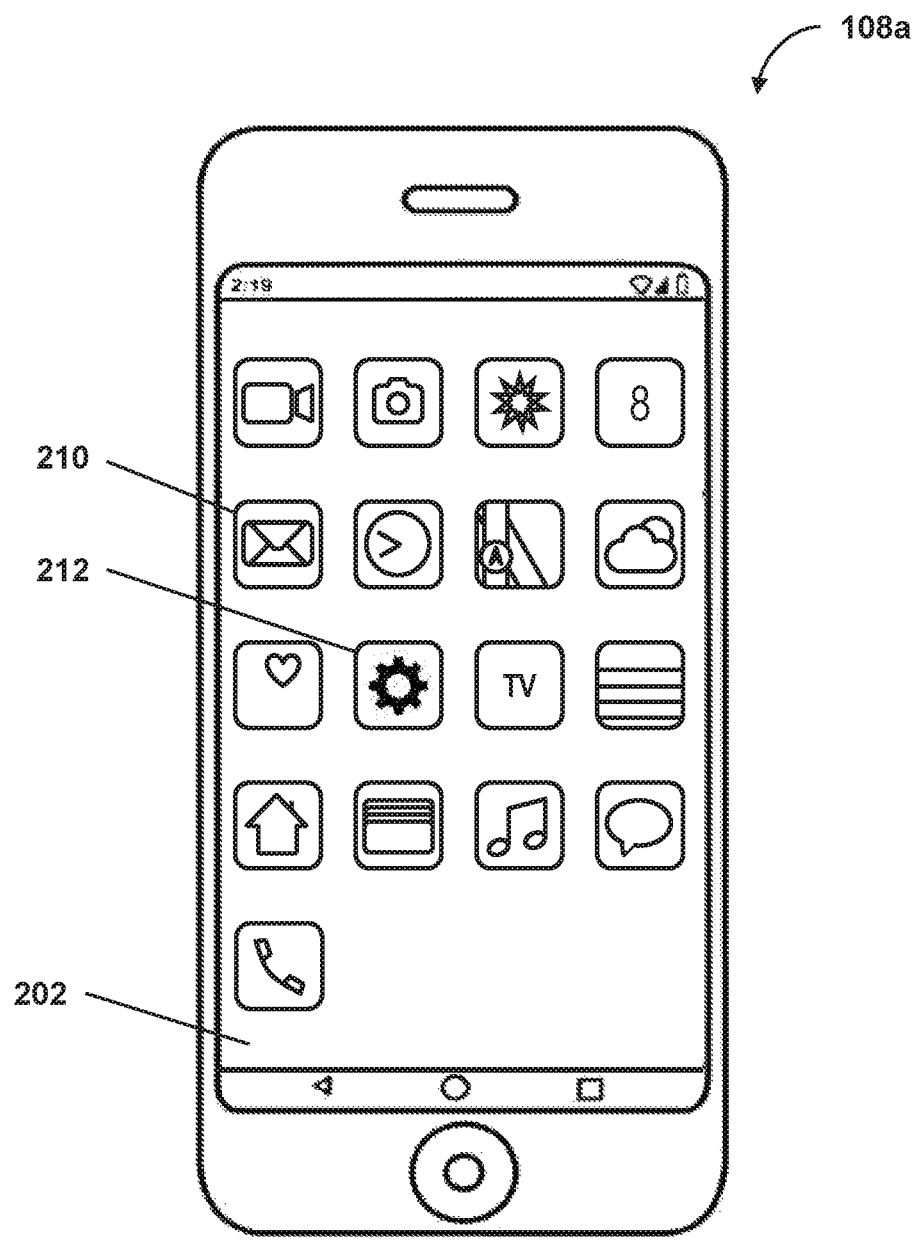
FIG. 2C shows a client device displaying the virtual device user interface of the virtual device in the second state, in accordance with one or more embodiments.

In some embodiments, computer system 102a (e.g., communication subsystem 110) may communicate information associated with a virtual device user interface of a virtual device to client device 108a (e.g., the client device 108a may receive this information via communication subsystem 140). The computer system 102a (e.g., communication subsystem 110) may prepare and send (e.g., stream) information associated with the virtual device user interface 202 in the second state 250 (e.g., which is fully loaded) to the client device 108a. The virtual device user interface 202 may be sent as an image or a video (e.g., a stream of h264 encoded video) to the client device 108a. FIG. 2C shows a client device 108a displaying information associated with the virtual device user interface 202 of the virtual device in the second state 250, in accordance with one or more embodiments. In response to obtaining the information associated with the virtual device user interface 202 (e.g., via communication subsystem 140), client device 108a may present the information associated with the virtual device user interface 202 via a display screen of the client device 108a (e.g., using display subsystem 144).

In some embodiments, a frame buffer 122 (as illustrated in memory 106 of the computer system 102a in FIG. 1) may store a bitmap corresponding to the virtual device user interface 202. The computer system 102a may generate a frame of display data (e.g., a video signal or an image) based on a portion of the bitmap that corresponds to the virtual device user interface 202, encode the frame of display data, and send the frame of display data to the client device 108a. In response to obtaining such frame of display data, the client device 108a may present the virtual device user interface 202 via a display screen (e.g., display subsystem 144) of the client device 108a (see FIG. 2C). In addition, the computer system 102a may only perform macroblock comparison related to the virtual device user interface 202 during the encoding process. Generating frames of display data, encoding of frames of display data, and performing macroblock comparisons during the encoding process are described in U.S. Pat. No. 10,503,458, which is incorporated herein by reference.

In some embodiments, computer system 102a (e.g., pairing subsystem 116) may detect a disconnection of a physical device (e.g., client device 108a) from the virtual device platform 104a (e.g., computer system 102a). In response to the detected disconnection of the physical device (e.g., client device 108a), loading subsystem 112 may reboot the virtual device (e.g., the virtual device that has been previously fully loaded). For example, rebooting the virtual device may include returning the virtual device to its preloaded or partially loaded state (e.g., a first state). In other words, the virtual device may be returned to the state in which it existed prior to the connection request from the physical device 108a. The virtual device may thus be ready to be connected to a physical device. In some embodiments, pairing subsystem 116 may obtain a new connection request from a new physical device (e.g., from pairing subsystem 142 via network 152). In some embodiments, the new physical device may initiate a connection request device (e.g., via pairing subsystem 142) when the new physical device powers on. In some embodiments, the new physical device may initiate a connection request device (e.g., via pairing subsystem 142) in response to a selection of an application (e.g., client application). In some embodiments, the connection request may comprise a request to access a preloaded virtual device.

In some embodiments, in response to the new connection request, computer system 102a (e.g., pairing subsystem 116) may identify a new user associated with the new physical device. For example, pairing subsystem 116 may retrieve new user profile information based on the identified new user. In some embodiments, pairing subsystem 116 or pairing subsystem 142 may retrieve new user profile information associated with the new user from the new physical device or from a database or memory associated with virtual device platform 104a. In some embodiments, pairing subsystem 116 or pairing subsystem 142 may further retrieve new device profile information associated with the new physical device. For example, the new device profile information may include information such as type, model, storage capacity, software capabilities, hardware capabilities, connectivity, operating system, or other specifications associated with the physical device.

In some embodiments, loading subsystem 112 may load the rebooted virtual device or may load a different preloaded virtual device. For example, loading subsystem 112 may complete the loading process for the rebooted virtual device or another preloaded virtual device, such that the loading of the rebooted virtual device or another preloaded virtual device is complete (e.g., a second state). In some embodiments, loading subsystem 112 may fully load a virtual device based on the new user profile information and/or the new device profile information. For example, loading subsystem 112 may use the new device profile information to fully load the virtual device such that the virtual device is compatible with hardware and software capabilities of the new physical device. In some embodiments, loading subsystem 112 may load new applications associated with the virtual device based on the new device profile information (e.g., applications associated with a type of device indicated by the new device profile information). For example, if the loading subsystem 112 determines that the new physical device is an Android device based on the new device profile information, the loading subsystem 112 may load compatible data and applications based on the new device profile information. Loading subsystem 112 may load any information (e.g., display configurations, hardware configurations, software configurations, storage configurations, privacy configurations, etc.) based on the new device information indicated by the new device profile information.

In some embodiments, once the virtual device has been fully loaded (e.g., is in the second state), communication subsystem 110 may communicate, for example, information associated a virtual device user interface of such a virtual device to the new physical device. The computer system 102a (e.g., communication subsystem 110) may prepare and send (e.g., stream) the information associated with the virtual device user interface in the second state (e.g., which is fully loaded) to the new physical device. The information associated with the virtual device user interface may be sent as an image or a video (e.g., a stream of h264 encoded video) to the new physical device. In response to obtaining the information associated with the virtual device user interface (e.g., via communication subsystem 140), the new physical device may present the virtual device user interface via a display screen (e.g., display subsystem 144) of the new physical device.

The methods described above may reduce latency experienced by a user of a physical device connecting to a virtual device platform by reducing the amount of data that must be loaded following a connection request from the physical device. In some embodiments, the use of virtual devices may additionally be advantageous from a security standpoint. For example, if the physical device is lost or stolen, data associated with the virtual applications cannot be accessed by a bad actor, as the virtual applications (and associated data) are hosted and run on virtual device platform 104a. It should be understood that the methods described herein may be performed by any components of system 100. Additionally, the methods may be performed individually or in conjunction with other methods described herein.

Predictive Loading of a Virtual Device in Anticipation of a Connection Request from a Physical Device In some embodiments, system 100 may facilitate predictive loading. Predictive loading may enable system 100 to load virtual devices in anticipation of connection requests from physical devices. Predictive loading may benefit users of physical devices by reducing latency (e.g., delays due to loading time). Accurate predictive loading may reduce wasted resources by loading an optimal number of virtual devices shortly before they are accessed by corresponding physical devices.

In some embodiments, computer system 102a (e.g., prediction subsystem 114) may predict a first time at which a first physical device (e.g., client device 108a) will connect to the virtual device platform 104a. In some embodiments, prediction subsystem 114 may generate the prediction of the first time based on a first connection pattern associated with the first physical device. In some embodiments, the first connection pattern may be a historic connection pattern. For example, the first connection pattern may indicate that client device 108a connects to the virtual device platform 104a each day at 8:20 am EST. The first predicted time may therefore be 8:20 am EST. In some embodiments, a plurality of times associated with a client device 108a may be predicted. For example, client device 108a may connect to the virtual device platform 104a at a different time each day. On weekdays, client device 108a may connect to the virtual device platform 104a at 9:22 am EST on weekdays and at 10:15 am EST on weekends. In another example, client device 108a may connect to virtual device platform 104a each day at either 8:00 am EST or 9:00 am EST. In some embodiments, the first predicted time may be a time range. For example, the first connection pattern may indicate that client device 108a connects to virtual device platform 104a between 7:10 am EST and 7:52 am EST each morning.

In some embodiments, the first connection pattern may be a recent connection pattern. For example, prediction subsystem 114 may predict the first time based on connection times between client device 108a and the virtual device platform 104a within a certain previous time period (e.g., within the past three days, the past two week, the past month, etc.). In some embodiments, the prediction subsystem 114 may dynamically update the recent connection pattern with each new connection. In some embodiments, a historic connection pattern or a recent connection pattern may be used to calculate a variance from the first predicted time. For example, prediction subsystem 114 may calculate a standard deviation associated with the historic connection times or the recent connection times (e.g., all historic connection times or recent historic connection times). In some embodiments, variance may be calculated for other types of predictions, such as device type, numbers of devices, or other predictions.

In some embodiments, predictions (e.g., time, device type, number of devices, etc.) may be based on weights assigned to data. For example, a weight assigned to a first time at which a physical device 108a connected to the virtual device platform 104 may be different than a weight assigned to a second time at which the same physical device 108a connected to the virtual device platform 104. In some embodiments, recency or relevancy may be used to weight data used for predictions. For example, if a physical device connected to virtual device platform 104a at 8 am two years ago and connected to virtual device platform 104a at 9 am yesterday, the weight assigned to the 9 am connection may be higher, as it is more recent and relevant. These weights may be changed dynamically with the passage of time (with the passage of time, older data become less relevant). Accordingly, the weights assigned to historical patterns may constantly change.

Prediction subsystem 114 may use weighted historic connection data (e.g., as described above) to predict times at which a physical device will connect to virtual device platform 104a. For example, prediction subsystem 114 may obtain information associated with a physical device. In some embodiments, the information may include historic connection information indicating times at which the physical device has connected to virtual device platform 104a historically. The information may also include a device identifier, device information, or other information associated with the physical device. Prediction subsystem 114 may obtain weights associated with the historic connection information. In some embodiments, more recent connection data may be weighted more heavily than older connection data. These weights may be changed dynamically with the passage of time (with the passage of time, older data become less relevant). Accordingly, the weights assigned to historical patterns may constantly change. Prediction subsystem 114 may then predict a time at which the physical device will connect to virtual device platform 104a. For example, the prediction may be based on the historic connection information associated with the physical device and the weights associated with the historic connection information.

In some embodiments, the first predicted time may depend on a time zone. For example, if the user of client device 108a travels to a different time zone, client device 108a may connect to virtual device platform 104a at a different time (e.g., due to the time zone change). For example, if client device 108a travels to the pacific time zone (or is predicted to travel to the pacific time zone), client device 108a may connect to virtual device platform 104a at 8:20 am PST (e.g., 11:20 am EST). In other words, prediction subsystem 114 may therefore take the location (or predicted location) of client device 108a into account when predicting the first time.

In some embodiments, prediction subsystem 114 may distinguish between patterns of connection, location, and other behaviors of a user. For example, prediction subsystem 114 may identify usual patterns, unusual patterns, anomalies, and other events. In one example, prediction subsystem 114 may distinguish travel on vacation from travel for work (e.g., working from another office). Prediction subsystem 114 may further identify which events may repeat (e.g., travel for work), which events may happen once (e.g., travel for a wedding), and other patterns. Accordingly, at least based on historic connection pattern or a recent connection pattern, the prediction subsystem 114 may be able to identify unusual patterns or anomalies and may account for such unusual patterns or anomalies when predicting a time at which a physical device 108a will connect to the virtual device platform 104.

Prediction subsystem 114 may predict a physical device that will connect to virtual device platform 104a at a particular time. For example, prediction subsystem 114 may make its prediction based on physical devices that typically connect to virtual device platform 104a at a particular time. In some embodiments, users may activate and connect different physical devices at different times. For example, a user may connect a first physical device (e.g., the user's personal cell phone) at 7 am EST each morning and may connect a second physical device (e.g., the user's work cell phone) at 8 am EST each morning. Prediction subsystem 114 may also take into account various usual patterns, unusual patterns, and anomalies in historic data when making a prediction. For example, changes in time zones may affect which devices a user connects to virtual device platform 104a. In another example, a user may not connect the second physical device to virtual device platform 104a at all while on vacation. Prediction subsystem 114 may use these and other patterns to predict a physical device that will connect to virtual device platform 104a at a particular time.

In some embodiments, prediction subsystem 114 may predict a time at which a user will connect to the virtual device platform 104a. For example, the first predicted time may be a time at which the user is predicted to connect to virtual device platform 104a, regardless of which device the user uses to connect. For example, the first predicted time may comprise a prediction of a time at which any of the user's devices will connect to virtual device platform 104a. In some embodiments, prediction subsystem 114 may predict a user who will connect to virtual device platform 104a at a particular time. For example, historic information may indicate various users who connect to virtual device platform 104a at different times. For example, a first user may connect each weekday at 8 am EST while a second user typically connects each weekday at 8:20 am EST. Prediction subsystem 114 may use this historic data to predict a user who will connect to virtual device platform 104a at a particular time (e.g., 8:20 am EST). Prediction subsystem 114 may rely on any usual patterns, unusual patterns, or anomalies in the historic data. Prediction subsystem 114 may use any of the methods discussed above to predict the time at which the user will connect to virtual device platform 104a or a user who will connect to virtual device platform 104a at a particular time.

In some embodiments, prediction subsystem 114 may predict a time at which a type of device will connect to virtual device platform 104a. For example, prediction subsystem 114 may make its prediction based on times at which various types of physical devices have connected to virtual device platform 104a in the past. For example, a first type of physical device (e.g., smartphone) may typically connect to virtual device platform 104a at 6 am EST, while a second type of device (e.g., laptop) may typically connect to virtual device platform 104a at 9:30 am EST. Prediction subsystem 114 may use this historic data to predict a time at which a particular type of device (e.g., laptop) will connect to virtual device platform 104a. In some embodiments, prediction subsystem 114 may predict a type of device that will connect to the virtual device platform at a particular time. For example, prediction subsystem 114 may make its prediction based on types of physical devices that typically connect to virtual device platform 104a at a particular time. In some embodiments, users may activate and connect different types of physical devices to virtual device platform 104a at different times. For example, a user may connect a first type of physical device (e.g., phone) at 7:15 am EST each morning and may connect a second type of physical device (e.g., tablet) at 8:45 am EST each morning. As discussed above, prediction subsystem 114 may take into account various usual patterns, unusual patterns, and anomalies in historic data when making a prediction. Prediction subsystem 114 may use any of the methods discussed above to predict the time at which a type of device will connect to virtual device platform 104a or a type of device that will connect to virtual device platform 104a at a particular time.

In some embodiments, prediction subsystem 114 may predict a number of devices that will connect to virtual device platform 104a at a particular time. For example, prediction subsystem 114 may make its prediction based on a number of physical devices that typically connect to virtual device platform 104a at a particular time. In some embodiments, various users may activate and connect physical devices at certain common times (e.g., in the morning, when starting the work day, in the evening, etc.). For example, many users may connect to virtual device platform 104a at a particular time (e.g., at the beginning of a work day). Prediction subsystem 114 may use such historic data to predict a number of physical devices that will connect to virtual device platform 104a at, for example, 9 am EST. In some embodiments, prediction subsystem 114 may predict a time at which a particular number of devices will connect to virtual device platform 104a. For example, virtual device platform 104a may receive specific numbers of connections requests at various times throughout the day (e.g., when most people wake up for work). Prediction subsystem 114 may use such historic data to predict a time at which a number of physical devices will connect to virtual device platform 104a. As discussed above, prediction subsystem 114 may take into account various usual patterns, unusual patterns, and anomalies in historic data when making a prediction. Prediction subsystem 114 may use these and other patterns to predict a number of physical devices that will connect to virtual device platform 104a at a particular time or a time at which a particular number of physical devices will connect to virtual device platform 104a. Prediction subsystem 114 may make any of the above-mentioned predictions, other predictions, or any combination therein.

In some embodiments, prediction subsystem 114 may train one or more prediction models (e.g., machine learning models, neural networks, etc.) to facilitate predictive loading of virtual devices. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free flowing, with connections interacting in a more chaotic and complex fashion.

In some embodiments, the prediction model may update its configurations (for example, weights, biases, or other parameters) based on its assessment of the predictions. Database 132 (e.g., as shown in FIG. 1) may include training data and one or more trained prediction models.

FIG. 3 shows a machine learning model system 300 for making predictions that facilitate reduction in latency experienced by a user of a physical device connecting to a virtual device platform, in accordance with one or more embodiments. As an example, a machine learning model 302 may take inputs 304 and provide outputs 306. In one use case, outputs 306 may be fed back (e.g., active feedback) to machine learning model 302 as input to train machine learning model 302 (e.g., alone or in conjunction with user indications of the accuracy of outputs 306, labels associated with the inputs 304, or with other reference feedback information). In another use case, machine learning model 302 may update its configurations (e.g., weights, biases, or other parameters) based on its assessment of its prediction (e.g., outputs 306) and reference feedback information (e.g., user indication of accuracy, reference labels, or other information). In another use case, where machine learning model 302 is a neural network, connection weights may be adjusted to reconcile differences between the neural network's prediction and the reference feedback. In a further use case, one or more neurons (or nodes) of the neural network may require that their respective errors be sent backward through the neural network to them to facilitate the update process (e.g., backpropagation of error). Updates to the connection weights may, for example, be reflective of the magnitude of error propagated backward after a forward pass has been completed. In this way, for example, the machine learning model 302 may be trained to generate better predictions.

For example, in some embodiments, inputs 304 may comprise connection patterns (e.g. historic or recent connection times) between physical devices or users and a virtual device platform (e.g., virtual device platform 104a). In some embodiments, inputs 304 may include historic connection data indicating physical devices that connect to virtual device platform 104a. For example, inputs 304 may include a time (e.g., a particular time, hour, day, week, month, year, etc.) at which the virtual device platform 104a received connection requests from physical devices, and reference feedback information 306 (which is fed back as input to the machine learning model 302) may include physical devices that historically connect to virtual device platform 104a at the time, to train machine learning model 302. Accordingly, when a particular time is provided as input 302 to machine learning model 302, machine learning model 302 may provide an output 306 including a predicted physical device that will connect to virtual device platform 104a at the particular time. In some embodiments, inputs 304 may include a time at which the virtual device platform 104a received connection requests from user profiles (e.g., user identifications), and reference feedback information 306 (which is fed back as input to the machine learning model 302) may include user profiles (e.g., user identifications) that historically connect to virtual device platform 104a at the time, to train machine learning model 302. Accordingly, when a particular time is provided as input 302 to machine learning model 302, machine learning model 302 may provide an output 306 including a predicted user that will connect to virtual device platform 104a at the particular time. In some embodiments, inputs 304 may include a time at which the virtual device platform 104a received connection requests from types of physical devices, and reference feedback information 306 (which is fed back as input to the machine learning model 302) may include types of physical devices that connect to virtual device platform 104a at the time, to train machine learning model 302. Accordingly, when a particular time is provided as input 302 to machine learning model 302, machine learning model 302 may provide an output 306 including a predicted type of physical device that will connect to virtual device platform 104a at the particular time. In some embodiments, inputs 304 may include a time at which the virtual device platform 104a received connection requests from numbers of physical devices, and reference feedback information 306 (which is fed back as input to the machine learning model 302) may include numbers of physical devices that connect to virtual device platform 104a at the time, to train machine learning model 302. Accordingly, when a particular time is provided as input 302 to machine learning model 302, machine learning model 302 may provide an output 306 including a predicted number of physical device that will connect to virtual device platform 104a at the particular time.

In some embodiments, inputs 304 may include physical device identifications of physical devices that connect to virtual device platform 104a, and reference feedback information 306 (which is fed back as input to the machine learning model 302) may include times at which specific physical devices connect to virtual device platform 104a, to train machine learning model 302. Accordingly, when a particular physical device identifier is provided as input 304 to machine learning model 302, machine learning model 302 may provide an output 306 including one or more predicted times at which a particular physical device will connect to virtual device platform 104a. In another example, inputs 304 may include user identifications (e.g., user profiles) of users that connect to virtual device platform 104a, and reference feedback information 306 (which is fed back as input to the machine learning model 302) may include times at which users connect to virtual device platform 104a, to train machine learning model 302. Accordingly, when a particular user identification (e.g., user profile) is provided as input 302 to machine learning model 302, machine learning model 302 may provide an output 306 including one or more predicted times at which the particular user will connect to virtual device platform 104a. In some embodiments, inputs 304 may include types of physical devices that connect to virtual device platform 104a, and reference feedback information 306 (which is fed back as input to the machine learning model 302) may include times at which various types of physical devices connect to virtual device platform 104a, to train machine learning model 302. Accordingly, when a particular type of physical device is provided as input 302 to machine learning model 302, machine learning model 302 may provide an output 306 including one or more predicted times at which the particular type of physical device will connect to virtual device platform 104a. In some embodiments, inputs 304 may include numbers of physical devices that connect to virtual device platform 104a, and reference feedback information 306 (which is fed back as input to the machine learning model 302) may include times at which certain numbers of physical devices typically connect to virtual device platform 104a, to train machine learning model 302. Accordingly, when a particular number of physical devices is provided as input 302 to machine learning model 302, machine learning model 302 may provide an output 306 including one or more predicted times at which the particular number of physical devices will connect to virtual device platform 104a.

In another example, machine learning model 302 may predict behaviors or locations of a user. For example, inputs 304 may include a time at which the virtual device platform 104a received connection requests from various locations, and reference feedback information 306 (which is fed back as input to the machine learning model 302) may include historic locations (e.g., home and work locations, travel locations, etc.) from which users or physical devices connect to virtual device platform 104a at the time. In some embodiments, reference feedback 306 may additionally include user profiles or device identifications. Accordingly, when a particular time is provided as input 302 to machine learning model 302, machine learning model 302 may provide an output 306 including one or more predicted locations of a user or physical device at the particular time. In another example, machine learning model 302 may predict latencies that will be associated with virtual device platforms 104a-104n in the future. For example, inputs 304 may include times at which virtual device platform 104a-104n received connection requests, and reference feedback information 306 (which is fed back as input to the machine learning model 302) may include latencies that have historically been associated with virtual device platforms 104a-104n, to train machine learning model 302. Accordingly, when a particular time is provided as input 302 to machine learning model 302, machine learning model 302 may provide an output 306 including a predicted latency that will be associated with a virtual device platform (e.g., virtual device platform 104a) at the particular time. In some embodiments, system 100 may include multiple models that are trained to output different predictions (e.g., the described above or other predictions).

Returning to FIG. 1, in some embodiments, computer system 102a (e.g., prediction subsystem 114) may predict a second time at which a second physical device (e.g., client device 108b) will connect to the virtual device platform (e.g., virtual device platform 104a). In some embodiments, prediction subsystem 114 may generate the prediction of the second time based on a second connection pattern (e.g., historic, recent, etc.) associated with the second physical device. In some embodiments, the second physical device may be associated with a second user. In some embodiments, the second physical device may be associated with the same user as the first physical device. For example, the first physical device (e.g., client device 108a) may be a first device (e.g., smartphone) of the user and the second physical device (e.g., client device 108b) may be a second device (e.g., laptop) of the user. Prediction subsystem 114 may predict the second time at which the second physical device will request connection to the virtual device platform 104a using any of the criteria or methods discussed above. In some embodiments, as described above, a second prediction generated by prediction subsystem 114 may include a predicted time, predicted device, predicted type of device, predicted number of devices, or any combination therein. Although first and second prediction times are described above, it should be understood that only one time at which a physical device will connect to virtual device platform 104a may be predicted or additional times at which one or more additional physical devices will connect to virtual device platform 104a may be predicted.

In some embodiments, computer system 102a (e.g., pairing subsystem 116 or pairing subsystem 142) may retrieve first user profile information of a first user associated with the first physical device (e.g., from the first physical device or from a database or memory associated with virtual device platform 104a) and retrieve second user profile information of a second user associated with the second physical device (e.g., from the second physical device or from a database or memory associated with virtual device platform 104a). The memory 106 or database 132 may store information that identifies users associated with one or more physical devices 108. Accordingly, the identity of the users associated with one or more physical devices may be retrieved from memory 106 or database 132. In some embodiments, user profile information may include calendar information associated with the user, accounts associated with the user, personal identifying information, health data associated with the user, contact information associated with the user, payment information associated with the user, connections to external accounts (e.g., cloud accounts) associated with the user, login information (e.g., usernames or passwords) for accounts associated with the user, settings (e.g., preferences or configurations, such as layout view, color themes, preferred languages, data format, message, display format, application settings, network connection settings) associated with devices or accounts of the user, files or directories to which the user has access, or other user profile information. In some embodiments, the user profile information may be located on the first physical device and the second physical device, associated with the first physical device and the second physical device, located in a database or memory associated with virtual device platform 104*a*, or located elsewhere.

In some embodiments, pairing subsystem 116 or pairing subsystem 142 may additionally retrieve device profile information associated with the first physical device and the second physical device. For example, the device profile information may include information such as type, model, display configuration, storage capacity, software capabilities, hardware capabilities, connectivity, operating system, or other specifications of the physical device. As discussed above, the first physical device and the second physical device may belong to the same user. In this case, pairing subsystem 116 or pairing subsystem 142 may retrieve user profile information associated with the user of both physical devices and the device profile information associated with both the physical devices (e.g., from a database or memory associated with virtual device platform 104*a*, or from another location).

In some embodiments, computer system 102*a* (e.g., loading subsystem 112) may load a first virtual device specific to the first user. Loading subsystem 112 may load the first virtual device based on the first user profile information associated with the first user or device profile information associated with the first physical device. In some embodiments, loading subsystem 112 may load the first virtual device at the first predicted time (e.g., as predicted by prediction subsystem 114). In some embodiments, loading subsystem 112 may load the first virtual device at a first predetermined amount of time prior to the first predicted time. In some embodiments, the first predetermined amount of time may depend on the user, the physical device, or other factors. For example, the first predetermined amount of time may be based on a variance associated with the first predicted time (e.g., based on historic or recent connection patterns associated with a user or a device). The first predetermined amount of time may be directly proportional to the variance associated with the first predicted time. In some embodiments, the predetermined amount of time may be based on a range associated with the first predicted time (e.g., so that the first virtual device is loaded before the range begins). In some embodiments, other factors may affect the first predetermined amount of time. It should be understood that the first predetermined amount of time may vary based on the identified user and/or physical device associated with the identified user.

Loading the first virtual device may comprise booting an operating system in the virtual device platform, loading a virtual device user interface, determining one or more applications to load, obtaining data associated with such determined applications, and/or loading the applications and data associated with the applications. The loading of the first virtual device may be based on user profile information and/or device profile information. In some embodiments, the loading of the first virtual device may correspond to performing the loading of the first virtual device from start to finish. In other words, loading of the first virtual device may include starting and finishing the process of booting an operating system in the virtual device platform, loading a virtual device user interface, determining one or more applications to load, obtaining data associated with such determined applications, and/or loading the applications and data associated with the applications. Alternatively, in some embodiments, the loading of the first virtual device may correspond to a continuation of the loading of a preloaded virtual device. In other words, a first virtual device (or a plurality of virtual devices) may be preloaded (or partially loaded) (e.g., prior to retrieving user profile information or prior to obtaining a connection request from a physical device) and the loading of the first virtual device may correspond to continuing the loading of the preloaded first virtual device (or one of the plurality of preloaded virtual devices) based on the user profile information or the device profile information, such that the loading of the first virtual device is complete. Preloading (or partially loading) of one or more virtual devices is described above in detail and therefore, not repeated for the sake of brevity.

Loading subsystem 112 may load a second virtual device specific to the second user. Loading subsystem 112 may load the second virtual device based on the second user profile information associated with the second user or device profile information associated with the second physical device. In some embodiments, loading subsystem 112 may load the second virtual device at the second predicted time (e.g., as predicted by prediction subsystem 114). In some embodiments, loading subsystem 112 may load the second virtual device at a second predetermined amount of time prior to the second predicted time (e.g., as discussed above). In some embodiments, the second predetermined amount of time may depend on the user, the physical device, or other factors. For example, the second predetermined amount of time may be based on a variance associated with the second predicted time (e.g., based on historic or recent connection patterns associated with a user or a device). The second predetermined amount of time may be directly proportional to the variance associated with the second predicted time. In some embodiments, the predetermined amount of time may be based on a range associated with the second predicted time (e.g., so that the second virtual device is loaded before the range begins). In some embodiments, other factors may affect the second predetermined amount of time. It should be understood that the second predetermined amount of time may vary based on the identified user and/or physical device associated with the identified user.

Loading the second virtual device may comprise booting an operating system in the virtual device platform, loading a virtual device user interface, determining one or more applications to load, obtaining data associated with such determined applications, and/or loading the applications and data associated with the applications. The loading of the second virtual device may be based on user profile information and/or device profile information. In some embodiments, the loading of the second virtual device may correspond to performing the loading of the second virtual device from start to finish. In other words, loading of the second virtual device may include starting and finishing the process of booting an operating system in the virtual device platform, loading a virtual device user interface, determining one or more applications to load, obtaining data associated with such determined applications, and/or loading the applications and data associated with the applications. Alternatively, in some embodiments, the loading of the second virtual device may correspond to a continuation of the loading of a preloaded virtual device. In other words, a second virtual device (or a plurality of virtual devices) may be preloaded (or partially loaded) (e.g., prior to retrieving user profile information or prior to obtaining a connection request from a physical device) and the loading of the second virtual device may correspond to continuing the loading of the preloaded second virtual device (or one of the plurality of preloaded virtual devices) based on the user profile information or device profile information, such that the loading of the second virtual device is complete. Preloading (or partially loading) of one or more virtual devices is described above in detail and is therefore not repeated for the sake of brevity.

Although the above description discusses loading of first and second virtual devices at predetermined amounts of time prior to the first and second predicted times, the following are additional examples of loading performed by the loading subsystem 112. In some embodiments, loading subsystem 112 may load virtual devices based on predictions generated by prediction subsystem 114 and based on retrieved user profile information and/or device profile information. For example, loading subsystem 112 may be caused to load a virtual device associated with a physical device and/or identified user of the physical device at a specific time based on a time at which the physical device is predicted to connect to virtual device platform 104a (e.g., according to prediction subsystem 114). In some embodiments, loading subsystem 112 may be caused to load a virtual device at or before a time at which a device is predicted to connect to virtual device platform 104a (e.g., according to prediction subsystem 114). In some embodiments, loading subsystem 112 may be caused to load a virtual device corresponding to a type of physical device that is predicted to connect to virtual device platform 104a (e.g., according to prediction subsystem 114). In some embodiments, loading subsystem 112 may be caused to load a type of virtual device associated with a type of physical device predicted to connect to virtual device platform 104a at or before a time at which the type of physical device is predicted to connect to virtual device platform 104a (e.g., according to prediction subsystem 114). In some embodiments, loading subsystem 112 may be caused to load a number of virtual devices corresponding to a number of physical devices that are predicted to connect to virtual device platform 104a (e.g., according to prediction subsystem 114). In some embodiments, loading subsystem 112 may be caused to load a number of virtual devices corresponding to a number of physical devices that are predicted to connect to virtual device platform 104a at or before the time at which the number of physical devices are predicted to connect to virtual device platform 104a. These or other loading patterns may exist and may be performed individually or in conjunction.

In some embodiments, loading subsystem 112 may additionally or alternatively load one or more versions of virtual device user interfaces (e.g., for each virtual device that is loaded). For example, each user may own several physical devices (e.g., cell phone, tablet, laptop, smart television, or other devices). Each of the user's physical devices may have a different resolution, size, dimensions, layout, or interface. Loading subsystem 112 may therefore load several virtual device user interface varieties of different operating systems, sizes, resolutions, or dimensions. In other words, a plurality of virtual devices that are associated with different virtual device user interface versions may be loaded. In some embodiments, loading subsystem 112 may load a plurality of configurations (e.g., a plurality of resolutions, pixel dimensions, or pixel density) for the virtual device user interfaces. The plurality of configurations may correspond to a low resolution (and a low pixel density), a medium resolution (and a medium pixel density), and a high resolution (and a high pixel density) for the virtual device user interfaces. The user may later access these loaded virtual device user interfaces (e.g., if the user switches physical devices during a session). For example, if the user is accessing a virtual device associated with a first physical device (e.g., cell phone) but switches to a second physical device (e.g., tablet), pairing subsystem 116 may retrieve a loaded virtual device associated with a virtual device user interface having the correct size, resolution, dimension, or other quality associated with the second physical device. Because a plurality of virtual devices associated with different varieties of the virtual device user interfaces are loaded, the user may experience decreased latency when switching devices. It should be understood that any number of virtual devices associated with different operating systems, resolutions, dimensions, or other configurations may be loaded.

In some embodiments, in response to a first connection request from the first physical device (e.g., client device 108a), computer system 102a (e.g., pairing subsystem 116 or pairing subsystem 142) may cause information associated with the first virtual device to be accessed by the first physical device (e.g., client device 108a). In some embodiments, information associated with the first virtual device may be accessed via a client device user interface and the client device user interface may render (e.g., via display subsystem 144) information associated with a virtual device user interface via a display of the client device 108a. In other words, information associated with a virtual device user interface (or a portion of the virtual device user interface) may be accessed and displayed via a client application running on (or hosted by) the client device 108a. The computer system 102a (e.g., communication subsystem 110) may prepare and send (e.g., stream) information associated with a virtual device user interface of the first virtual device to the first physical device (e.g., client device 108a). The information associated with the virtual device user interface may be sent as an image or a video (e.g., a stream of h264 encoded video) to the first physical device.

In some embodiments, in response to a second connection request from the second physical device (e.g., client device 108b), computer system 102a (e.g., pairing subsystem 116) may cause information associated with the second virtual device to be accessed by the second physical device (e.g., client device 108b). In some embodiments, information associated with the second virtual device may be accessed via a client device user interface and the client device user interface may render (e.g., via display subsystem 144) information associated with a virtual device user interface via a display of the client device 108b. In other words, information associated with a virtual device user interface (or a portion of the virtual device user interface) may be accessed and displayed via a client application running on (or hosted by) the client device 108b. The computer system 102a (e.g., communication subsystem 110) may prepare and send (e.g., stream) information associated with a virtual device user interface of the second virtual device to the second physical device (e.g., client device 108b). The information associated with the virtual device user interface may be sent as an image or a video (e.g., a stream of h264 encoded video) to the second physical device.

In response to obtaining the information associated with the virtual device user interfaces, the first and second physical devices may present (e.g., via display subsystem 144) information associated with the virtual device user interfaces via a display screen of the physical devices. As shown in FIG. 2C, client device 108a may display information associated with the virtual device user interface 202. By gaining access to the virtual devices, the physical devices may also gain access to applications associated with the virtual devices. Accordingly, a user of the first or second physical device may access applications running on (or hosted by) virtual device platform 104a without having the need to run these applications on the physical devices. In some embodiments, this may be advantageous from a security standpoint. For example, if the physical device is lost or stolen, data associated with the virtual applications cannot be accessed by a bad actor, as the virtual applications (and associated data) are hosted and run on virtual device platform 104a.

Predictive loading of virtual devices may be advantageous for users of physical devices connecting to a virtual device platform due to decreased latency. For example, predicting times at which physical devices will connect to the virtual device platform and loading the virtual devices (associated with the physical devices) at or prior to the predicted time at which the physical devices will connect to the virtual device platform decreases latency experienced by users of the physical devices that connect to the virtual device platform to access virtual devices. The users may experience decreased latency and therefore a better user experience.

It should be understood that the methods described herein may be performed by any components of system 100. Additionally, the methods may be performed individually or in conjunction with other methods described herein.

Selecting a Virtual Device Platform Based on Latencies Associated with a Plurality of Virtual Device Platforms In some embodiments, system 100 may facilitate a reduction in latency associated with accessing a virtual device via a physical device by determining latencies associated with a plurality of virtual device platforms that load (or host) virtual devices. System 100 may select a virtual device platform (e.g., having the lowest latency from among a plurality of virtual device platforms) to load or access a virtual device. The latency experienced by the user may therefore be reduced, leading to an improved user experience.

In some embodiments, system 100 (e.g., computer system 102a (latency determination subsystem 118)) may determine a latency (e.g., network latency, computational latency) associated with each of a plurality of virtual device platforms 104a-104n. In some embodiments, virtual device platform 104a may be associated with one or more servers. In some embodiments, a central server may determine latencies associated with a plurality of virtual device platforms 104a-104n, select a virtual device platform (e.g., virtual device platform 104a) on which a virtual device should be loaded based on the determined latencies associated with the plurality of virtual device platforms 104a-104n, and perform all the processes described below (e.g., the processes described below with regard to subsystems illustrated in FIG. 1). In some embodiments, such a central server may correspond to a computer system 102a or a virtual device platform 104a. In some embodiments, the central server may be separate from the computer system 102a and may communicate with the computer system 102a via a network 152. In some embodiments, one or more servers may be associated with a single virtual device platform. In some embodiments, virtual device platforms may be associated with one or more different servers, and one or more virtual device platforms may be co-located on a single server (e.g., computer system 102a). In some embodiments, computer system 102a may function as a server or may be associated with a server. In some embodiments, one or more virtual devices may be associated with each virtual device platform or with each server. In some embodiments, virtual device platforms may exist in different locations (e.g., geographic locations, servers, or other locations) or the same location.

In some embodiments, the latency may correspond to a time interval or delay between a stimulation (e.g., a connection request from a physical device) and a response (e.g., from a virtual device platform 104a). In some embodiments, the latency may be a network latency or a computational (or processing) latency. In some embodiments, a network latency may include a delay in communication between a client device 108a and virtual device platform 104a, which may include a delay caused by the transmission medium between the client device and the virtual device platform, delay because of the distance between the client device and the virtual device platform, delay caused by routers that process the data between the client device and the virtual device platform, and delay caused by the path of communication between the client device and the virtual device platform.

Figure 4:
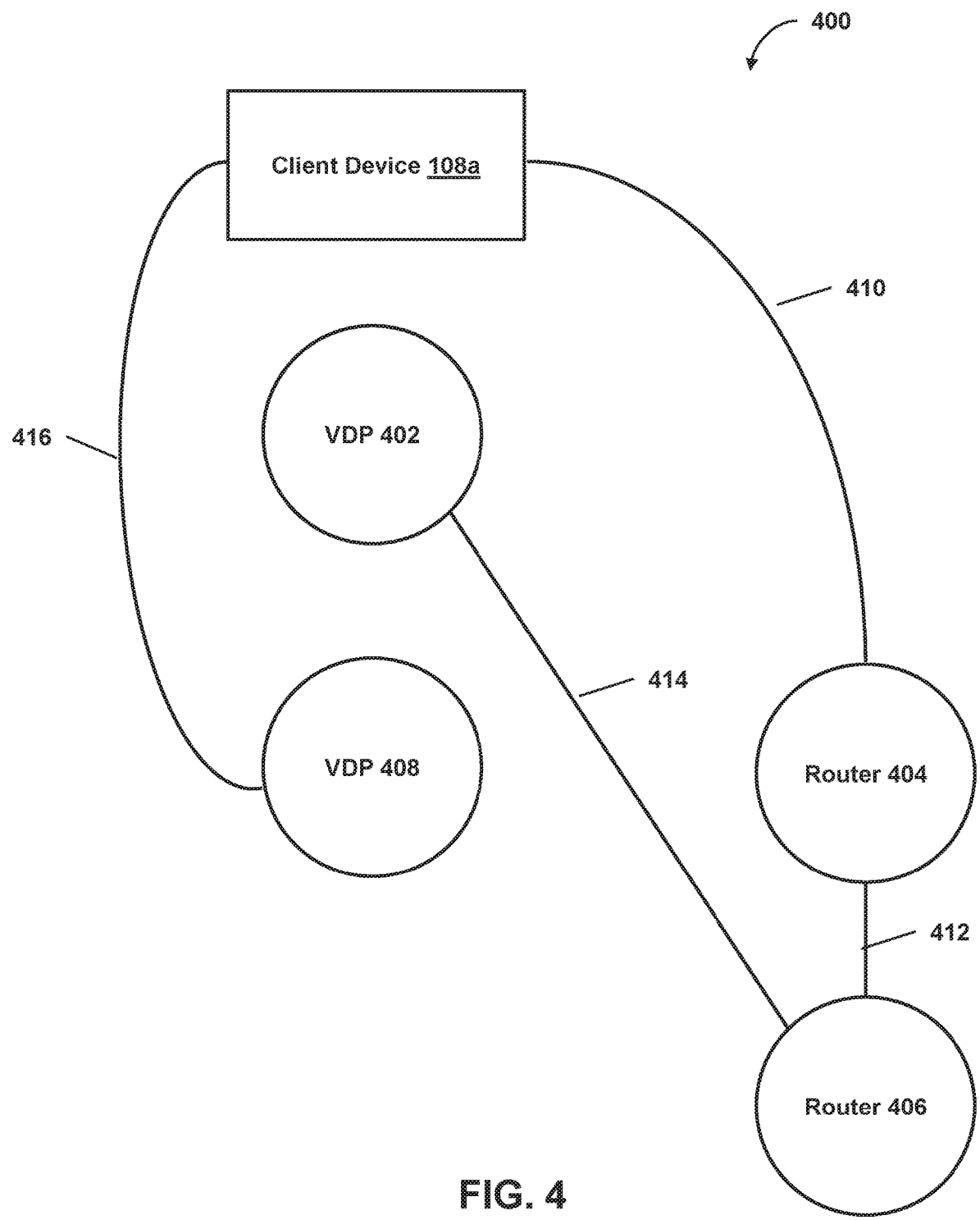
FIG. 4 shows a physical device in proximity to a plurality of virtual device platforms, in accordance with one or more embodiments.

In some embodiments, the latency may be dependent on a communication path (e.g., a number of hops) between a physical device (e.g., client device 108a) and virtual device platforms. FIG. 4 shows an example 400 of a physical device (e.g., client device 108a) in proximity to a plurality of virtual device platforms (e.g., VDP 402 and VDP 408) and routers (e.g., router 404 and router 406), in accordance with one or more embodiments. In some embodiments, VDP 402 and VDP 408 may correspond to virtual device platforms 104a-104n, as shown in FIG. 1. For example, VDP 402 may be closest in proximity to a location (or predicted location) of client device 108a. In some embodiments, VDP 408 may be further in proximity from the location of client device 108a. However, computer system 102a (e.g., latency determination subsystem 118) may determine that the path (for communication) from client device 108a to VDP 402 is longer (e.g., requiring more "hops") and is therefore associated with higher latency than the path (for communication) from client device 108a to VDP 408. For example, data may flow from VDP 402 through path 414 to router 406, then through path 412 to router 404, and finally through path 410 to client device 108a. This path, which requires three "hops" and which passes through routers which are further in proximity from client device 108a, may render the use of VDP 402 inefficient. In contrast, VDP 408 may connect to client device 108a via a single path (e.g., path 416). This may indicate that VDP 408 is the virtual device platform associated with a lower latency than a latency associated with VDP 402. Although FIG. 4 illustrates hops via one or more routers, it should be understood that the hops may be via any server or network segment that allows data to be routed from a client device 108a to a virtual device platform and vice versa.

Although the example in FIG. 4 illustrates the determination of latency based on the path of communication between the client device 108a and the virtual device platforms, it should be understood that system 100 may determine the latency caused by the transmission medium between the client device and the virtual device platform, the latency because of the distance between the client device and the virtual device platform, and/or latency caused by routers that process the data between the client device and the virtual device platform in order to determine the overall network latency between a client device 108 and a virtual device platform. In other words, the system 100 (e.g., a central server, computer system 102, or virtual device platform 104) may determine an overall network latency associated with a virtual device platform by determining the different latencies between the client device 108 and the virtual device platform. In some embodiments, the network latency associated with a virtual device platform may be determined based on one or more of the latencies described above between the client device 108 and the virtual device platform.

In some embodiments, in order to determine the network latency associated with a virtual device platform 104, the system 100 may determine a location (or predicted location, as described below) of a client device 108 that is attempting to connect to a virtual device platform. The location of a client device 108 may be determined using multilateration of radio signals between cell towers of a network and the client device 108 or using the client device's global positioning system (GPS). In some embodiments, the client device 108 may transmit its location to the computer system 102, which allows the computer system 102 to determine the network latencies between the client device 108 and a plurality of virtual device platforms 104. In other words, using the location (or predicted location) of the client device 108, system 100 may determine the network latencies associated each of the plurality of virtual device platforms.

In some embodiments, the system 100 may predict a location of client device 108a and may determine network latencies associated each of the plurality of virtual device platforms based on such a predicted location. For example, system 100 (e.g., latency determination subsystem 118) may analyze historic data for a user of client device 108a and historic data of the client device 108a. In some embodiments, the historic data may indicate patterns (e.g., travel patterns). For example, system 100 (e.g., latency determination subsystem 118) may determine that the user typically travels from New York to Tokyo, Japan on the first Monday of each month. In anticipation of this behavior, latency determination subsystem 118 may determine network latencies associated with virtual device platforms in proximity to Tokyo leading up to the first Monday of each month. System 100 (e.g., latency determination subsystem 118) may analyze latencies of virtual device platforms in proximity to New York on other days. Any other factors may be used to predict where a physical device will be in the future.

In some embodiments, latency associated with a virtual device platform may be a processing or computational latency associated with the virtual device platform. For example, a virtual device platform 104a (e.g., or an associated server, a computer system 102a) may have limited processing power. These or other factors may contribute to certain virtual device platforms 104a-104n being associated with higher processing or computational latency. In some embodiments, other types of latencies may also be considered, such as operational latency (e.g., time required to complete certain steps of a process), mechanical latency (e.g., physics-based limitations), or other types of latency. In addition to network latencies associated with virtual device platforms, system 100 (e.g., latency determination subsystem 118) may determine other latencies noted above.

In some embodiments, the latencies associated with each of the plurality of virtual device platforms may be inferred. For example, instead of calculating or determining the latencies associated with each of the virtual device platforms, system 100 (e.g., latency determination subsystem 118) may infer the latencies based on various criteria. For example, a network latency may be inferred based on a geographical distance between a physical device (or predicted location of a physical device) and the virtual device platforms. Further, processing latencies associated with the plurality of virtual device platforms may be inferred based on types of processors or servers used by the virtual device platforms. For example, older hardware may process data more slowly than newer hardware. Accordingly, different latencies may be inferred (e.g., estimated) instead of calculated or determined, and the inferred latency may be used to select a virtual device platform.

In some embodiments, each virtual device platform may be assigned a latency score based on the different latencies associated with each of the plurality of virtual device platforms. For example, a network latency (determined or inferred) associated with a first virtual device platform may be higher than a network latency (determined or inferred) associated with a second virtual device platform. However, a processing or computational latency (determined or inferred) associated with the first virtual device platform may be lower than a processing or computational latency (determined or inferred) associated with the second virtual device platform. Accordingly, system 100 (e.g., latency determination subsystem 118) may analyze the different latencies associated with the different virtual device platforms and assign a latency score for each of the plurality of virtual device platforms based on the different latencies associated with each of the plurality of virtual device platforms. Although the above description describes the latency score to be based on different latencies associated with the virtual device platforms, it should be understood that the latency score may be determined based on one or more of the latencies associated with the virtual device platforms. A high latency score may be associated with a higher latency.

In some embodiments, a latency score assigned to a virtual device platform may be relative to a physical device. In other words, a virtual device platform may be associated with different latency scores in relation to different physical devices. For example, a latency associated with a first virtual device platform in relation to a first physical device may be lower than a latency associated with the same first virtual device platform in relation to a second physical device. Accordingly, system 100 (e.g., latency determination subsystem 118) may assign two different latency scores for the first virtual device platform, where the first latency score is in relation to the first physical device and the second latency score is in relation to the second physical device.

In some embodiments, the system 100 may determine latencies associated with a subset of a plurality of virtual device platforms. For example, system 100 may determine a location of a client device 108 (or predict a location of a client device 108) and may select a subset of virtual device platforms that are proximate the client device 108 (e.g., within a predetermined distance threshold) and may determine a latency associated with each of the virtual device platforms in the subset. The system 100 may determine a subset of virtual device platforms based on one or more other criteria (e.g., based on currently available processing capacity, based on whether a virtual device platform is undergoing maintenance etc.) Accordingly, system 100 may not need to determine or infer the latencies associated with all the virtual device platforms, thereby saving computational and processing resources.

In some embodiments, prediction subsystem 114 may train one or more prediction models (e.g., machine learning models, neural networks, etc.) to facilitate predictions of locations and latency. For example, as shown in FIG. 3, machine learning model 302 may receive inputs 304 and generate outputs 306. In some embodiments, for example, inputs 304 may include a time at which the virtual device platform 104a received connection requests from various locations, and reference feedback information 306 (which is fed back as input to the machine learning model 302) may include historic locations (e.g., home and work locations, travel locations, etc.) from which users or physical devices connect to virtual device platform 104a at the time, to train machine learning model 302. In some embodiments, reference feedback information 306 may additionally include user profiles or device identifications associated with the users or the physical devices. Accordingly, when a particular time is provided as input 302 to machine learning model 302, machine learning model 302 may provide an output 306 including one or more predicted locations of a user or physical device at the particular time. In another example, machine learning model 302 may predict or infer latencies that will be associated with virtual device platforms 104a-104n in the future. For example, inputs 304 may include a time at which virtual device platform 104a receives connection requests, and reference feedback information 306 (which is fed back as input to the machine learning model 302) may include latencies that have historically been associated with virtual device platforms 104a-104n at the time, to train machine learning model 302. Accordingly, when a particular time is provided as input 302 to machine learning model 302, machine learning model 302 may provide an output 306 including one or more predicted latencies that will be associated with a virtual device platform (e.g., virtual device platform 104a) at the particular time.

In some embodiments, system 100 (e.g., latency determination subsystem 118) may select, from among the plurality of virtual device platforms 104a-104n, a first virtual device platform 104a for connecting to the physical device. The first virtual device platform 104a may be selected based on the first virtual device platform 104a having the lowest latency (or predicted or inferred latency) or latency score from among the plurality of virtual device platforms 104a-104n. In some embodiments, the first virtual device platform 104a may be selected based on the first virtual device platform 104a having the lowest of a particular type of latency or latency score from among the plurality of virtual device platforms 104a-104n. In some embodiments, the first virtual device platform 104a may be selected based on the first virtual device platform 104a having the lowest combined latency (e.g., based on processing latency, network latency, or other types of latency) or latency score from among the plurality of virtual device platforms 104a-104n. In some embodiments, the first virtual device platform 104a may be selected based on the location (or predicted location) of the physical device (e.g., client device 108a). For example, if system 100 (e.g., prediction subsystem 114) predicts that the user (and client device 108a) will be traveling to Tokyo on a particular day, system 100 (e.g., latency determination subsystem 118) may select a virtual device platform for that day based on the prediction that client device 108a will be in Tokyo. Proximity determinations for calculating latency may therefore be done with respect to Tokyo. In another example, if client device 108a is typically located in New York and is predicted to remain in New York, system 100 (e.g., latency determination subsystem 118) may calculate latency associated with virtual device platforms with respect to New York.

Alternatively, in some embodiments, the system 100 (e.g., latency determination subsystem 118) may select a virtual device platform (from among the plurality of virtual device platforms) that is associated with a latency (or latency score) that is less than a predetermined threshold. In other words, the system 100 (e.g., latency determination subsystem 118) may select any virtual device platform that is below a predetermined threshold latency.

In some embodiments, latency determination subsystem 118 may select a virtual device platform that is not associated with a lowest latency from among the plurality of virtual device platforms 104a-104n. For example, prediction subsystem 114 may predict a number of devices that will request to connect to virtual device platforms 104a-104n at a particular time. If a virtual device platform (e.g., virtual device platform 104a) is predicted to receive a high number of connection requests at the particular time, latency determination subsystem 118 may select a different virtual device platform (e.g., virtual device platform 104b). In some embodiments, latency determination subsystem 118 may select virtual device platform 104b based on virtual device platform 104b being associated with a latency that is predicted to be sufficiently low (e.g., second lowest, below a threshold, etc.) at the particular time. In some embodiments, latency determination subsystem 118 may select virtual device platform 104b based on a number of predicted connection requests for virtual device platform 104b at the particular time being sufficiently low. In some embodiments, latency determination subsystem 118 may use these or other criteria to select a virtual device platform on which to load one or more virtual devices.

In some embodiments, system 100 (e.g., pairing subsystem 116) may determine whether the first virtual device platform 104a includes user profile information associated with the user of the physical device or device profile information associated with the physical device. In some embodiments, user profile information may include calendar information associated with the user, accounts associated with the user, personal identifying information, health data associated with the user, contact information associated with the user, payment information associated with the user, connections to external accounts (e.g., cloud accounts) associated with the user, login information (e.g., usernames or passwords) for accounts associated with the user, settings (e.g., preferences or configurations, such as layout view, color themes, preferred languages, data format, message, display format, application settings, network connection settings) associated with devices or accounts of the user, files or directories to which the user has access, or other user profile information. In some embodiments, device profile information may include information such as type, model, storage capacity, software capabilities, hardware capabilities, connectivity, operating system, or other specifications of the physical device 108a.

In some embodiments, system 100 (e.g., pairing subsystem 116) may determine whether user profile information associated with the user is located on the first virtual device platform 104a (which may correspond to the platform that was determined or inferred to have a lowest latency or latency score among a plurality of virtual device platforms 104a-104n or to have a latency or latency score below a predetermined threshold). In some embodiments, the user profile information may be located on the first virtual device platform 104a, in a memory or database associated with the first virtual device platform 104a, in another virtual device platform, in a memory or database associated with another virtual device platform, or located elsewhere. In some embodiments, system 100 (e.g., pairing subsystem 116) may determine whether device profile information associated with the physical device associated with the user is located on the first virtual device platform 104a (which may correspond to the platform that was determined or inferred to have a lowest latency or latency score among a plurality of virtual device platforms 104a-104n or to have a latency or latency score below a predetermined threshold). In some embodiments, the device profile information may be located on the first virtual device platform 104a, in a memory or database associated with the first virtual device platform 104a, in another virtual device platform, in a memory or database associated with another virtual device platform, or located elsewhere.

If system 100 (e.g., pairing subsystem 116) determines that the first virtual device platform 104a includes user profile information associated with the user of the physical device or device profile information associated with the physical device, system 100 (e.g., loading subsystem 112) may load a virtual device based on the user profile information or device profile information (e.g., as discussed below). If system 100 (e.g., pairing subsystem 116) determines that the first virtual device platform 104a does not include the user profile information or device profile information, system 100 (e.g., pairing subsystem 116) may identify a second virtual device platform 104b that includes the user profile information or device profile information. In some embodiments, if the system 100 determines that multiple other virtual device platforms include the user profile information or device profile information, system 100 (e.g., latency determination subsystem 118) may retrieve the user profile information or device profile information from the virtual device platform that is associated with a lowest latency (from among the virtual device platforms that have the user profile information or device profile information). Alternatively, in some embodiments, system 100 (e.g., latency determination subsystem 118) may retrieve the user profile information or device profile information from the virtual device platform that has a lowest latency relative to the first virtual device platform 104a. System 100 (e.g., pairing subsystem 116) may then cause the second virtual device platform 104b to transfer the user profile information or device profile information to the first virtual device platform 104a. In some embodiments, transferring the user profile information or device profile information may comprise copying, sending, moving, or otherwise transferring the data associated with the user profile information or the device profile information. In some embodiments, the user profile information or device profile information may be subsequently removed from the second virtual device platform 104b.

In some embodiments, once the first virtual device platform 104a includes or obtains user profile information associated with the user of the physical device or device profile information associated with the physical device, system 100 (e.g., loading subsystem 112) may cause the first virtual device platform 104a to load a virtual device associated with the physical device. For example, system 100 (e.g., loading subsystem 112) may cause the first virtual device platform 104a to load the virtual device based on the user profile information or device profile information. The virtual device may be loaded prior to or after a connection request from the physical device. In some embodiments, the virtual device may be preloaded prior to a connection request and may be fully loaded after the connection request from the physical device. Loading the virtual device may comprise booting an operating system in the virtual device platform, loading a virtual device user interface, determining one or more applications to load, obtaining data associated with such determined applications, and/or loading the applications and data associated with the applications. The loading of the virtual device may be based on user profile information and/or device profile information. In some embodiments, the loading of the virtual device may correspond to performing the loading of the virtual device from start to finish. In other words, loading of the virtual device may include starting and finishing the process of booting an operating system in the virtual device platform, loading a virtual device user interface, determining one or more applications to load, obtaining data associated with such determined applications, and/or loading the applications and data associated with the applications. Alternatively, in some embodiments, the loading of the virtual device may correspond to a continuation of the loading of a preloaded virtual device. In other words, a virtual device (or a plurality of virtual devices) may be preloaded (or partially loaded) (e.g., prior to obtaining user profile information or prior to obtaining a connection request from a physical device) and the loading of the virtual device may correspond to continuing the loading of the preloaded virtual device (or one of the plurality of preloaded virtual devices) based on the user profile information or the device profile information, such that the loading of the virtual device is complete. Preloading (or partially loading) of one or more virtual devices is described above in detail and is therefore not repeated for the sake of brevity.

In some embodiments, loading the virtual device may include loading one or more versions of virtual device user interfaces. For example, each user may own several physical devices (e.g., cell phone, tablet, laptop, smart television, or other devices). Each of the user's physical devices may have a different resolution, size, dimensions, layout, or interface. System 100 (e.g., loading subsystem 112) may therefore load several virtual device user interface varieties of different operating systems, sizes, resolutions, or dimensions. In other words, a plurality of virtual devices that are associated with different virtual device user interface versions may be loaded. In some embodiments, system 100 (e.g., loading subsystem 112) may load a plurality of configurations (e.g., a plurality of resolutions, pixel dimensions, or pixel density) for the virtual device user interfaces. The plurality of configurations may correspond to a low resolution (and a low pixel density), a medium resolution (and a medium pixel density), and a high resolution (and a high pixel density) for the virtual device user interfaces. The user may later access these loaded virtual device user interfaces (e.g., if the user switches physical devices during a session). For example, if the user is accessing a virtual device associated with a first physical device (e.g., cell phone) but switches to a second physical device (e.g., tablet), system 100 (e.g., pairing subsystem 116) may retrieve a loaded virtual device associated with a virtual device user interface having the correct size, resolution, dimension, or other quality based on the second physical device. Because a plurality of virtual devices associated with different varieties of the virtual device user interfaces are loaded, the user may experience decreased latency when switching devices. It should be understood that any number of virtual devices associated with different operating systems, resolutions, dimensions, or other configurations may be loaded.

In some embodiments, the system 100 may obtain a connection request from the physical device. In response to obtaining such connection request, the system 100 may route the connection request to the selected virtual device platform so that the physical device may access the virtual device loaded by the selected virtual device platform. As discussed above, accessing the virtual device may include accessing information associated with a virtual device user interface associated with the virtual device, accessing virtual applications (that are run on or hosted via the selected virtual device platform) via the physical device, accessing the operating system associated with the virtual device, or accessing any data associated with the virtual device.

In some embodiments, selecting a virtual device platform based on latencies may be advantageous for users of physical devices connecting to the virtual device platform. For example, selecting the virtual device platform associated with the lowest latency (or predicted latency) or latency score and causing the selected virtual device platform to load a virtual device may reduce the latency experienced by the user when the user connects his/her physical device to the virtual device platform to access the virtual device and lead to a better user experience. Furthermore, the use of virtual devices on the virtual device platform may be advantageous from a security standpoint. For example, if the physical device is lost or stolen, data associated with the virtual applications cannot be accessed by a bad actor, as the virtual applications (and associated data) are hosted and run on virtual device platform 104a. It should be understood that the methods described herein may be performed by any components of system 100. Additionally, the methods may be performed individually or in conjunction with other methods described herein.

Example Flowcharts

FIGS. 5-11 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 5:
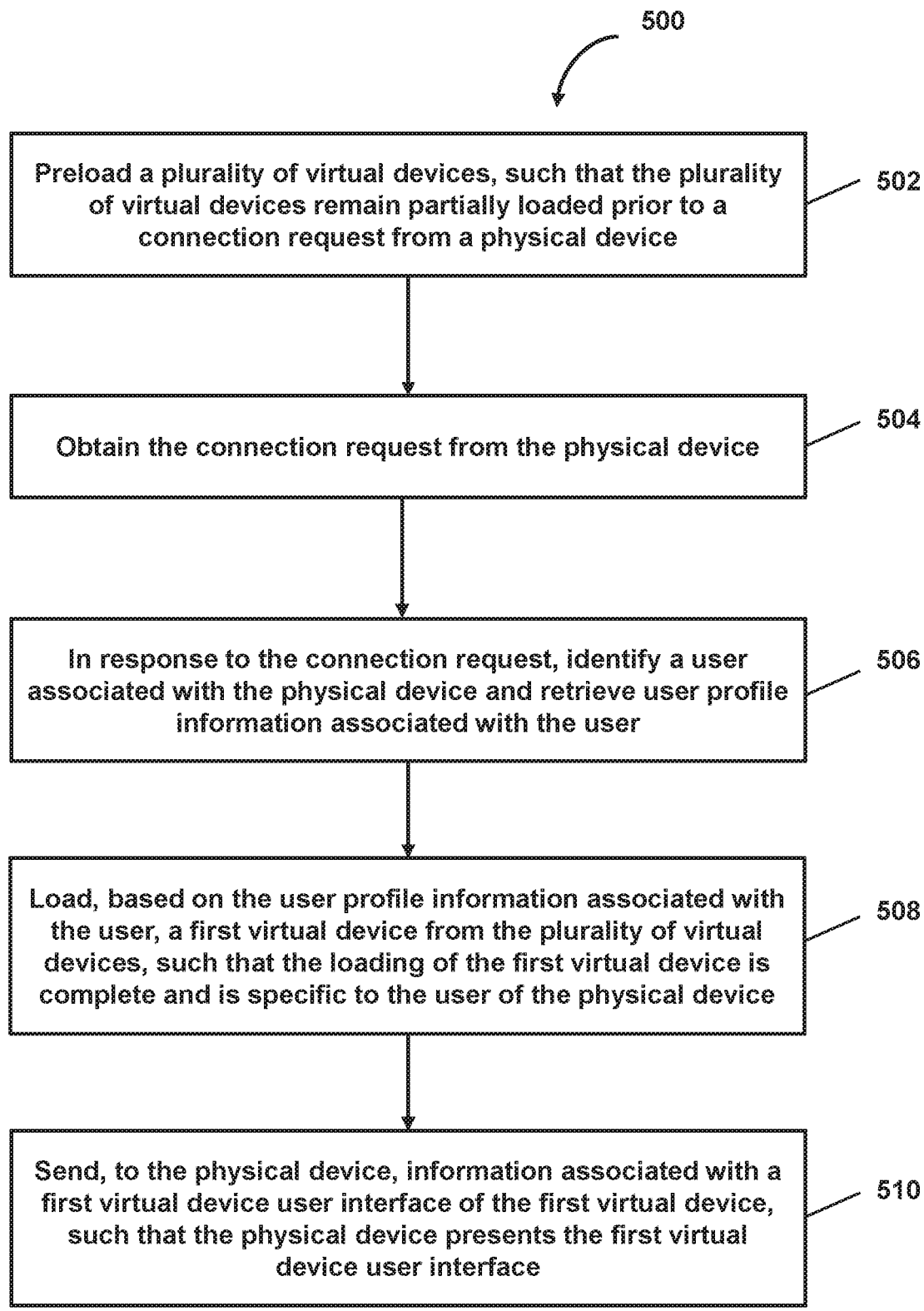
FIG. 5 shows a flowchart of a method for facilitating reduction in latency experienced by a user of a physical device by preloading virtual devices in anticipation of a connection request from the physical device, in accordance with one or more embodiments.

FIG. 5 shows a flowchart of a method 500 for facilitating reduction in latency experienced by a user of a physical device by preloading (e.g., partially loading) virtual devices in anticipation of a connection request from the physical device, in accordance with one or more embodiments, in accordance with one or more embodiments. In an operation 502, a plurality of virtual devices may be preloaded. For example, the plurality of virtual devices may remain partially loaded prior to a connection request from a physical device. In some embodiments, preloading may comprise partially loading the virtual devices (e.g., between one and ninety nine percent loaded). In some embodiments, operation 502 may be performed by a subsystem that is the same as or similar to loading subsystem 112.

In an operation 504, the connection request from the physical device may be obtained. For example, the physical device may request to be connected with a virtual device or a virtual device platform. In some embodiments, operation 504 may be performed by a subsystem that is the same as or similar to pairing subsystem 116. In an operation 506, a user associated with the physical device may be identified in response to the connection request. User profile information associated with the user may be retrieved. In some embodiments, device profile information associated with the physical device may also be retrieved. In some embodiments, operation 506 may be performed by a subsystem that is the same as or similar to pairing subsystem 116.

In an operation 508, a first virtual device from the plurality of virtual devices may be loaded. For example, the first virtual device may be loaded based on the user profile information associated with the user, such that the loading of the first virtual device may be complete and specific to the user of the physical device. The first virtual device may additionally or alternatively be loaded based on the device profile information associated with the physical device, such that the loading of the first virtual device may be complete and specific to the physical device. In some embodiments, operation 508 may be performed by a subsystem that is the same as or similar to loading subsystem 112. In an operation 510, information associated with a first virtual device user interface of the first virtual device may be sent to the physical device. For example, the physical device may present the information associated with the first virtual device user interface via a display screen of the physical device. In some embodiments, operation 510 may be performed by a subsystem that is the same as or similar to communication subsystem 110.

Figure 6:
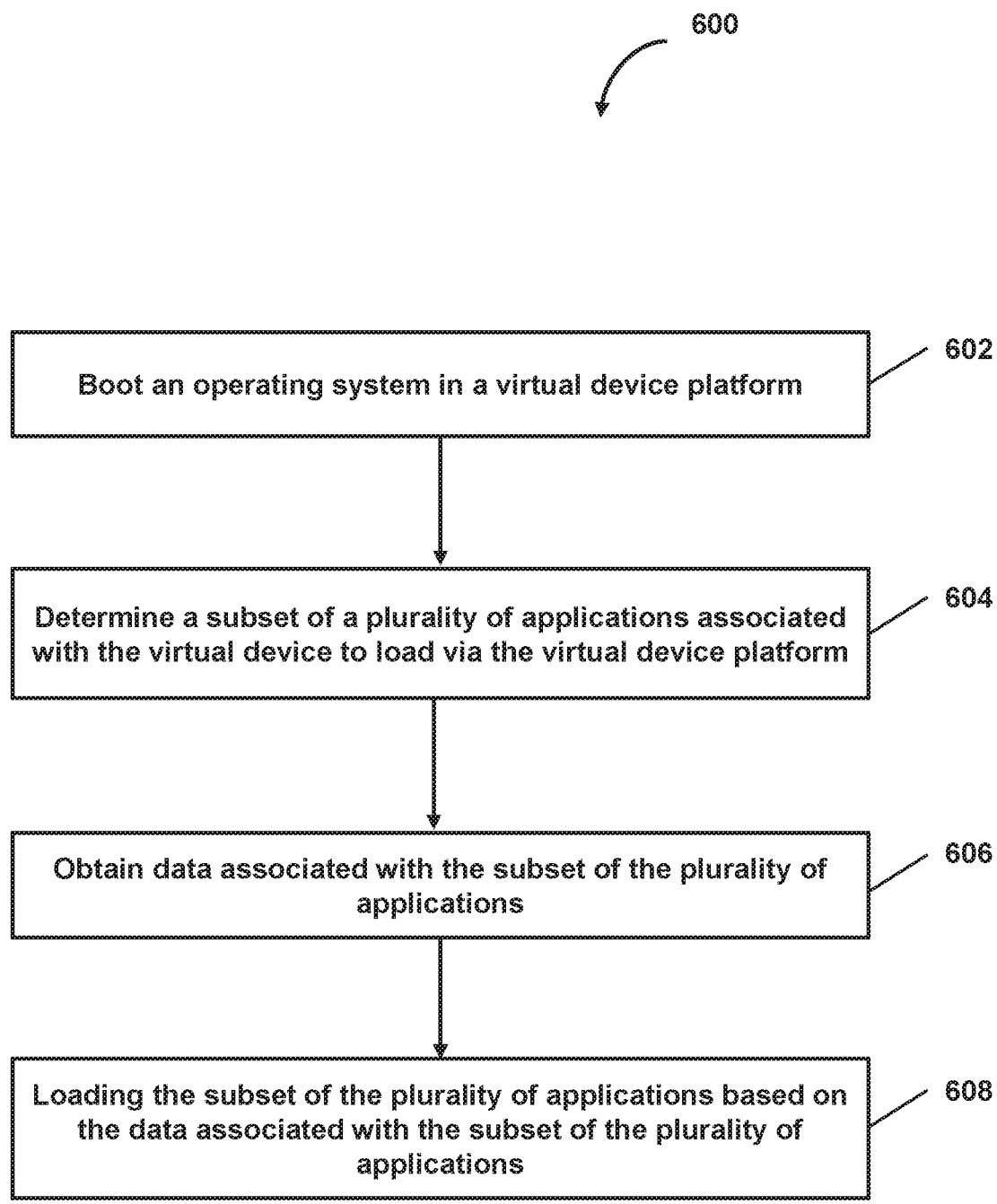
FIG. 6 shows a flowchart of a method for facilitating preloading of a virtual device, in accordance with one or more embodiments.

FIG. 6 shows a flowchart of a method 600 for facilitating preloading (e.g., partial loading) of a virtual device, in accordance with one or more embodiments. In an operation 602, an operating system in a virtual device platform may be booted. For example, a startup sequence of the operating system may be initiated such that data associated with the operating system is loaded. In some embodiments, the operating system may be associated with a particular virtual device. In some embodiments, operation 602 may be performed by a subsystem that is the same as or similar to loading subsystem 112.

In an operation 604, a subset of a plurality of applications (associated with the virtual device) to be loaded via the virtual device platform may be determined. For example, one or more applications of the subset of the plurality of applications may correspond to applications that are not user-specific or device-specific. In some embodiments, operation 604 may be performed by a subsystem that is the same as or similar to loading subsystem 112. In an operation 606, data associated with the subset of applications may be obtained. For example, data may include display information, audio information, user interface information, connections to other applications or accounts, or other information. Such data may not be user-specific or device-specific. In some embodiments, operation 606 may be performed by a subsystem that is the same as or similar to loading subsystem 112.

In an operation 608, the subset of the plurality of applications may be loaded (or partially loaded) based on the data associated with the subset of the plurality of applications. For example, the subset of the plurality of applications and data associated with the subset of the plurality of applications may be loaded (or partially loaded) via a virtual device platform. In some embodiments, the subset of the plurality of applications and data may be associated with a virtual device. In some embodiments, operation 608 may be performed by a subsystem that is the same as or similar to loading subsystem 112. Loading (or partially loading) of the subset of the plurality of applications may correspond to preloading (or partially loading) of the virtual device. Such preloading of the virtual device may be performed prior to a connection request from a physical device.

Figure 7:
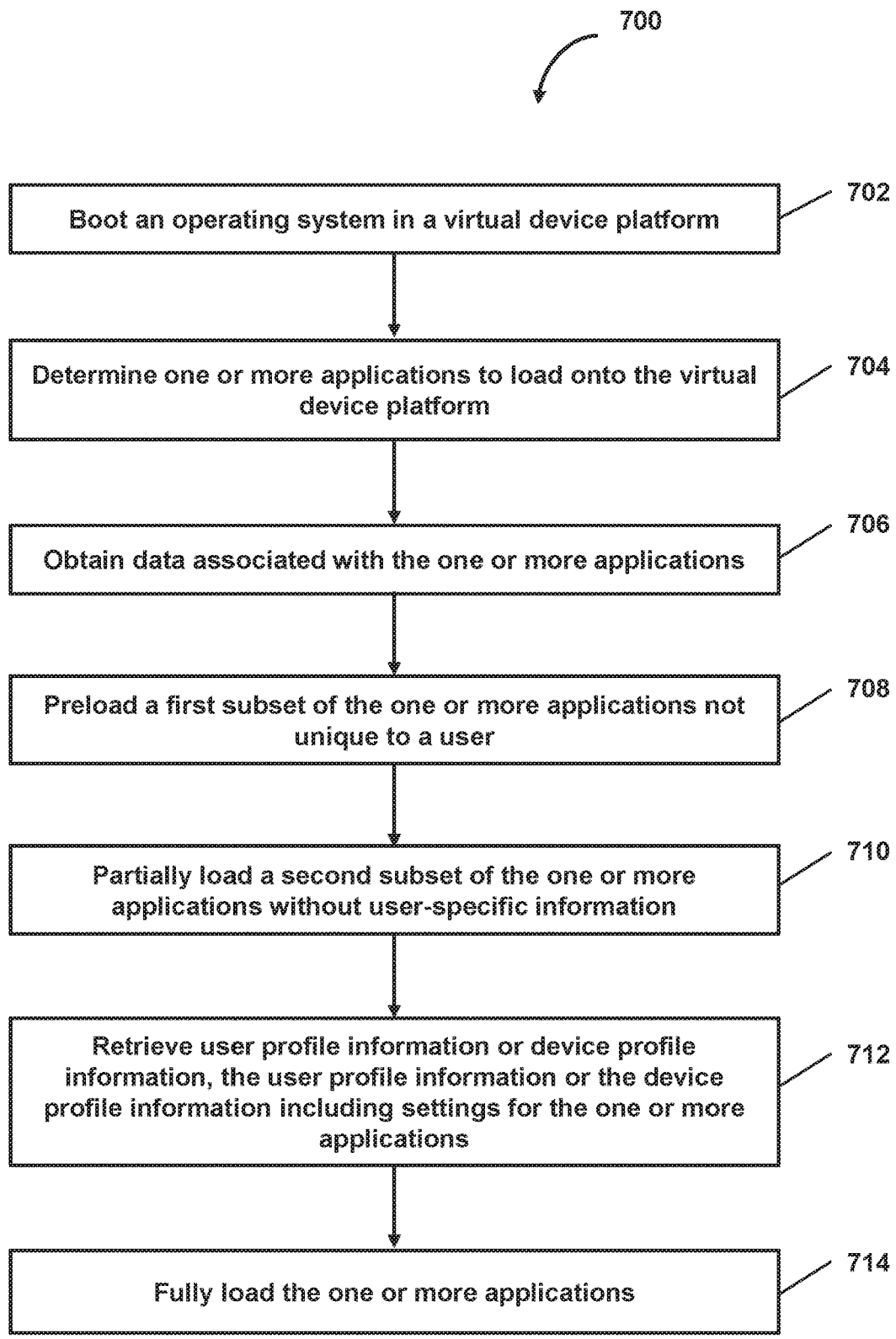
FIG. 7 shows a flowchart of a method for facilitating fully loading of a virtual device, in accordance with one or more embodiments.

FIG. 7 shows a flowchart of a method 700 for facilitating fully loading of a virtual device, in accordance with one or more embodiments. In an operation 702, an operating system in a virtual device platform may be booted. For example, a startup sequence of the operating system may be initiated such that data associated with the operating system is loaded. In some embodiments, the operating system may be associated with a particular virtual device. In some embodiments, operation 702 may be performed by a subsystem that is the same as or similar to loading subsystem 112.

In an operation 704, one or more applications (associated with the virtual device) to be loaded via the virtual device platform may be determined. In some embodiments, operation 704 may be performed by a subsystem that is the same as or similar to loading subsystem 112. In an operation 706, data associated with the one or more applications may be obtained. For example, data may include display information, audio information, user interface information, connections to other applications or accounts, and other information. In some embodiments, operation 706 may be performed by a subsystem that is the same as or similar to loading subsystem 112.

In an operation 708, a first subset of the one or more applications may be preloaded. For example, the first subset may include applications that are not unique to a user and such preloading of the first subset of one or more applications may include fully loading such application. For example, applications in the first subset may not include user specific profile information or device information. In some embodiments, operation 708 may be performed by a subsystem that is the same as or similar to loading subsystem 112. In an operation 710, a second subset of the one or more applications may be preloaded (e.g., partially loaded) without user-specific information. Partial loading may include loading display information, user interface information, or other information not specific to a user. In some embodiments, operation 710 may be performed by a subsystem that is the same as or similar to loading subsystem 112.

In an operation 712, user profile information or device profile information may be retrieved. In some embodiments, the user profile information or the device profile information may include settings or other information for the one or more applications. In some embodiments, operation 712 may be performed by a subsystem that is the same as or similar to loading subsystem 112. In an operation 714, the one or more applications may be fully loaded. For example, the second subset of the one or more applications (which was partially loaded in operation 710) may be fully loaded based on the retrieved user profile information or device profile information (e.g., including the retrieved settings for the one or more applications). In some embodiments, applications which were not previously preloaded or partially loaded may be loaded in operation 714. For example, applications that are user-specific may be loaded in operation 714. In some embodiments, operation 714 may be performed by a subsystem that is the same as or similar to loading subsystem 112.

Figure 8:
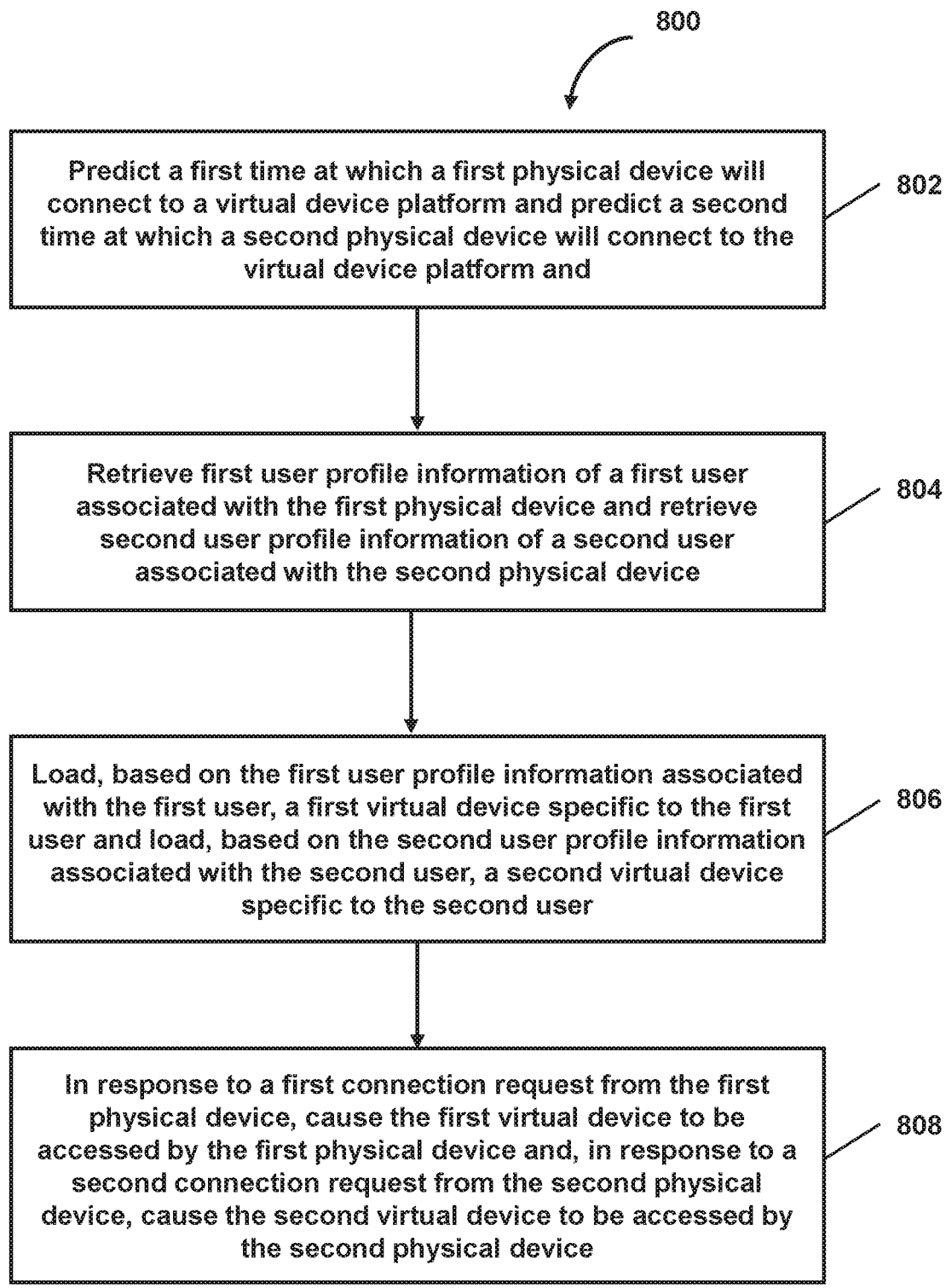
FIG. 8 shows a flowchart of a method for facilitating predictive loading of virtual devices in anticipation of a connection request from a physical device, in accordance with one or more embodiments.

FIG. 8 shows a flowchart of a method 800 for facilitating predictive loading of virtual devices in anticipation of a connection request from a physical device, in accordance with one or more embodiments. In an operation 802, a first time at which a first physical device will connect to a virtual device platform may be predicted and a second time at which a second physical device will connect to the virtual device platform may be predicted. In some embodiments, the predictions may be based on a first connection pattern associated with the first physical device and a second connection pattern associated with the second physical device. In some embodiments, operation 802 may be performed by a subsystem that is the same as or similar to prediction subsystem 114.

In an operation 804, first user profile information of a first user associated with the first physical device and second user profile information of a second user associated with the second physical device may be retrieved. Additionally or alternatively, first device profile information associated with the first physical device and second device profile information associated with the second physical device may be retrieved. In some embodiments, operation 804 may be performed by a subsystem that is the same as or similar to pairing subsystem 116.

In an operation 806, a first virtual device specific to the first user and a second virtual device specific to the second user may be loaded. In some embodiments, the first virtual device and the second virtual device may be loaded based on the first user profile information and the second user profile information, respectively. In some embodiments, the first virtual device and the second virtual device may additionally or alternatively be loaded based on the first device profile information and the second device profile information, respectively. In some embodiments, the first virtual device may be loaded at a first predetermined amount of time prior to the predicted first time and the second virtual device may be loaded at a second predetermined amount of time prior to the predicted second time. In some embodiments, operation 806 may be performed by a subsystem that is the same as or similar to loading subsystem 112.

In an operation 808, the first virtual device may be caused to be accessed by the first physical device in response to the first connection request from the first physical device. In some embodiments, the second virtual device may be caused to be accessed by the second physical device in response to the second connection request from the second physical device. In some embodiments, operation 808 may be performed by a subsystem that is the same as or similar to communication subsystem 110.

Figure 9:
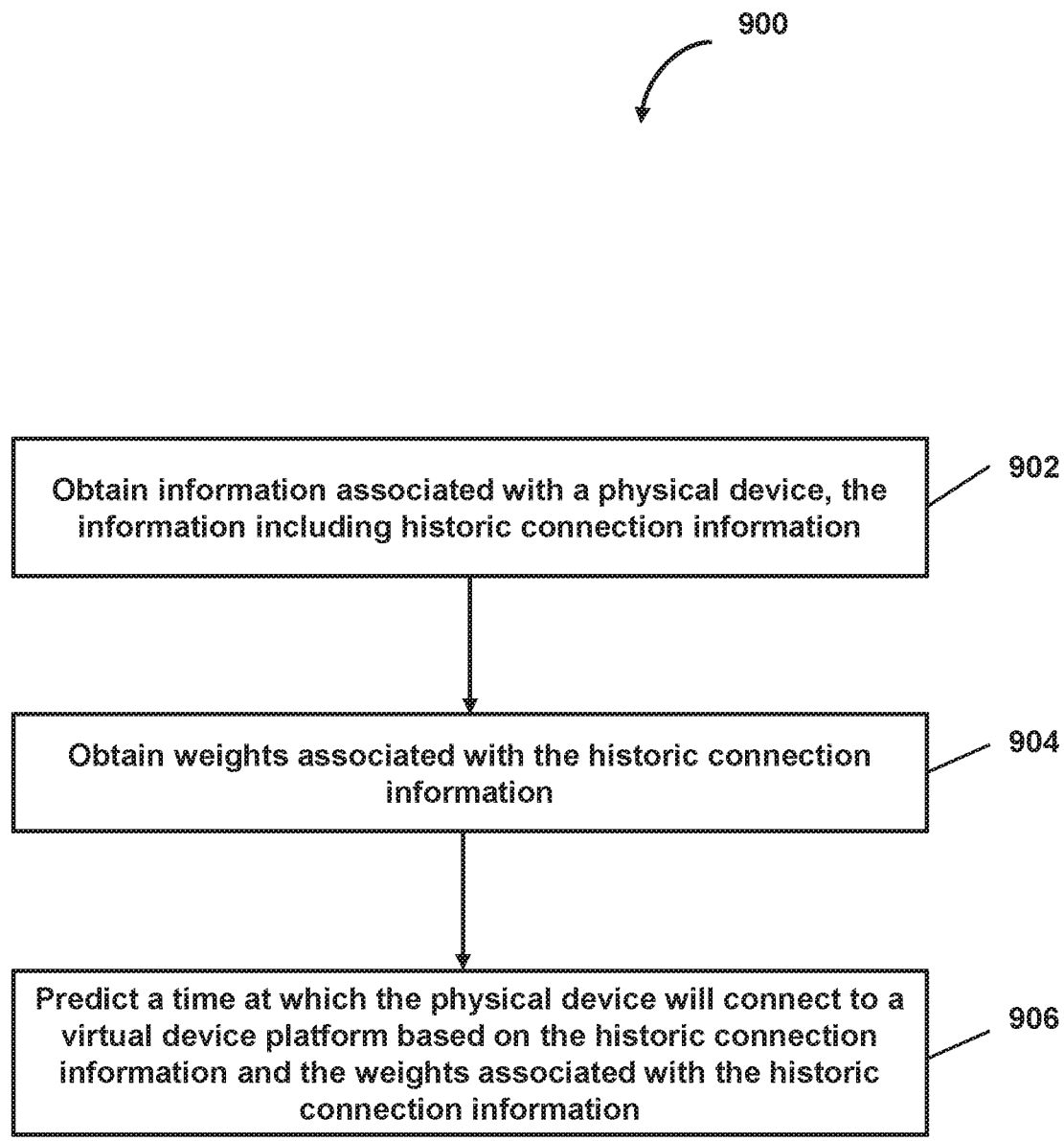
FIG. 9 shows a flowchart of a method for facilitating the prediction of times at which a physical device will connect to a virtual device platform, in accordance with one or more embodiments.

FIG. 9 shows a flowchart of a method 900 for facilitating the prediction of times at which a physical device will connect to a virtual device platform, in accordance with one or more embodiments. In an operation 902, information associated with a physical device may be obtained. In some embodiments, the information may include historic connection information indicating times at which the physical device has connected to a virtual device platform in the past. In some embodiments, the information may additionally include identification information (e.g., associated with the physical device or with a user of the physical device). In some embodiments, operation 902 may be performed by a subsystem that is the same as or similar to pairing subsystem 116.

In an operation 904, weights associated with the historic connection information may be obtained. For example, the weights may be assigned to specific historic connection times. In some embodiments, the weights may change dynamically with the passage of time. In other words, older connection times may be weighted less heavily and may therefore be less impactful on predictions. In some embodiments, the weights assigned to historic connection times may change constantly. In some embodiments, operation 904 may be performed by a subsystem that is the same as or similar to pairing subsystem 116.

In an operation 906, a time at which the physical device will connect to a virtual device platform may be predicted. For example, the time may be predicted based on the historic connection information and the weights associated with the historic connection information. In some embodiments, operation 906 may be performed by a subsystem that is the same as or similar to prediction subsystem 114.

Figure 10:
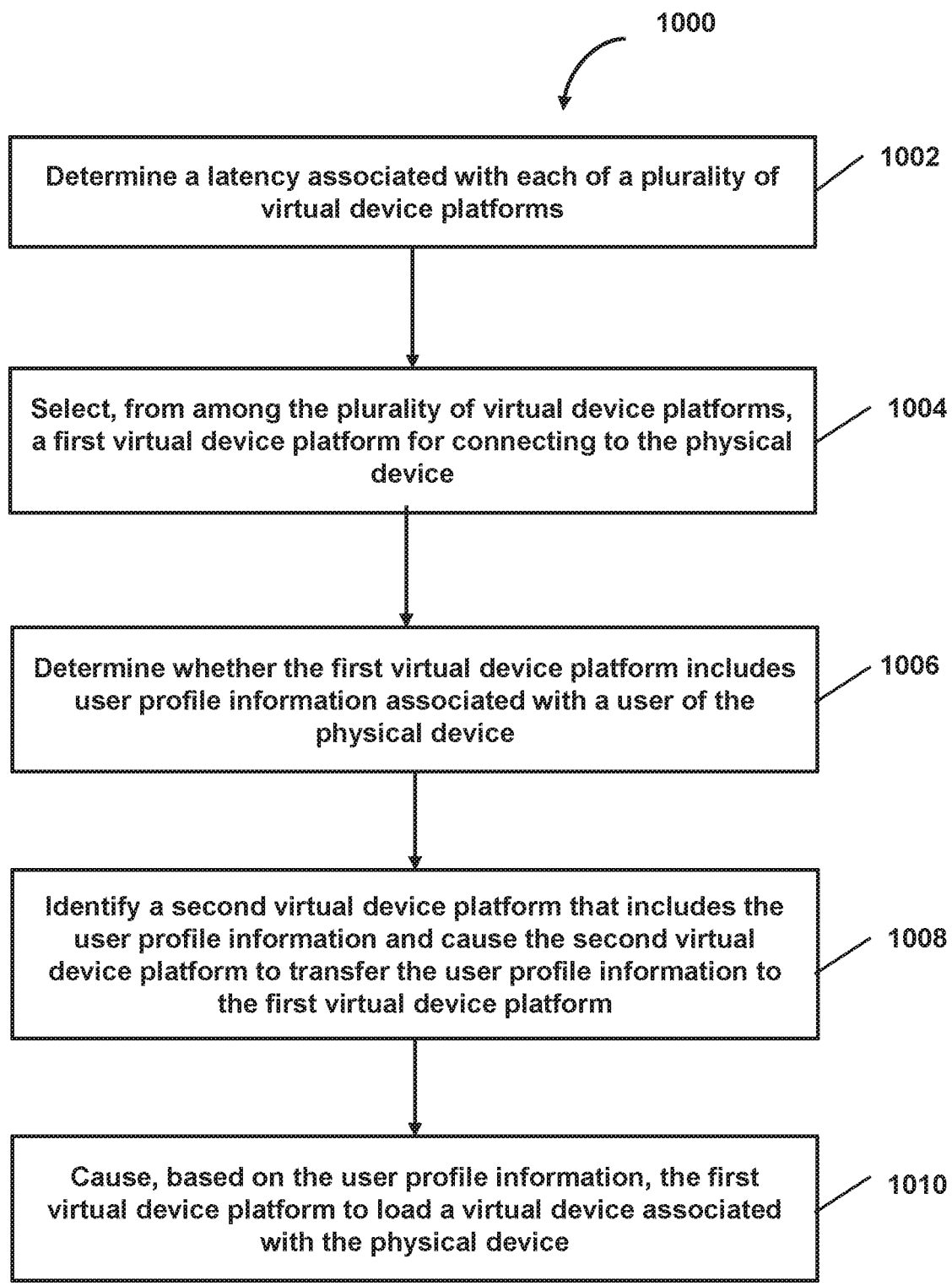
FIG. 10 shows a flowchart of a method for facilitating reduction in latency experienced by a user of a physical device by determining latencies associated with a plurality of virtual device platforms, in accordance with one or more embodiments.

FIG. 10 shows a flowchart of a method 1000 for facilitating reduction in latency experienced by a user of a physical device by determining latencies associated with a plurality of virtual device platforms, in accordance with one or more embodiments. In an operation 1002, a latency associated with each of a plurality of virtual device platforms may be determined. For example, the determined latency may include a network latency between a physical device and each of the plurality of virtual device platforms. In some embodiments, operation 1002 may be performed by a subsystem that is the same as or similar to latency determination subsystem 118.

In an operation 1004, a first virtual device platform from among the plurality of virtual device platforms may be selected for connecting to the physical device. In some embodiments, the first virtual device platform may be selected based on the first virtual device platform having the lowest determined latency from among the plurality of virtual device platforms. In some embodiments, operation 1004 may be performed by a subsystem that is the same as or similar to latency determination subsystem 118. In an operation 1006, it may be determined whether the first virtual device platform includes user profile information associated with a user of the physical device. Additionally or alternatively, it may be determined whether the first virtual device platform includes device profile information associated with the physical device. In some embodiments, operation 1006 may be performed by a subsystem that is the same as or similar to pairing subsystem 116.

In an operation 1008, a second virtual device platform that includes user profile information may be identified. In some embodiments, the second virtual device platform may be caused to transfer the user profile information to the first virtual device platform. In some embodiments, the second virtual device platform may be caused to transfer the device profile information to the first virtual device platform. In some embodiments, operation 1008 may be performed by a subsystem that is the same as or similar to pairing subsystem 116. In an operation 1010, the first virtual device platform may be caused to load a virtual device associated with the physical device. In some embodiments, the first virtual device may be loaded based on the user profile information or the device profile information. In some embodiments, operation 1010 may be performed by a subsystem that is the same as or similar to loading subsystem 112.

Figure 11:
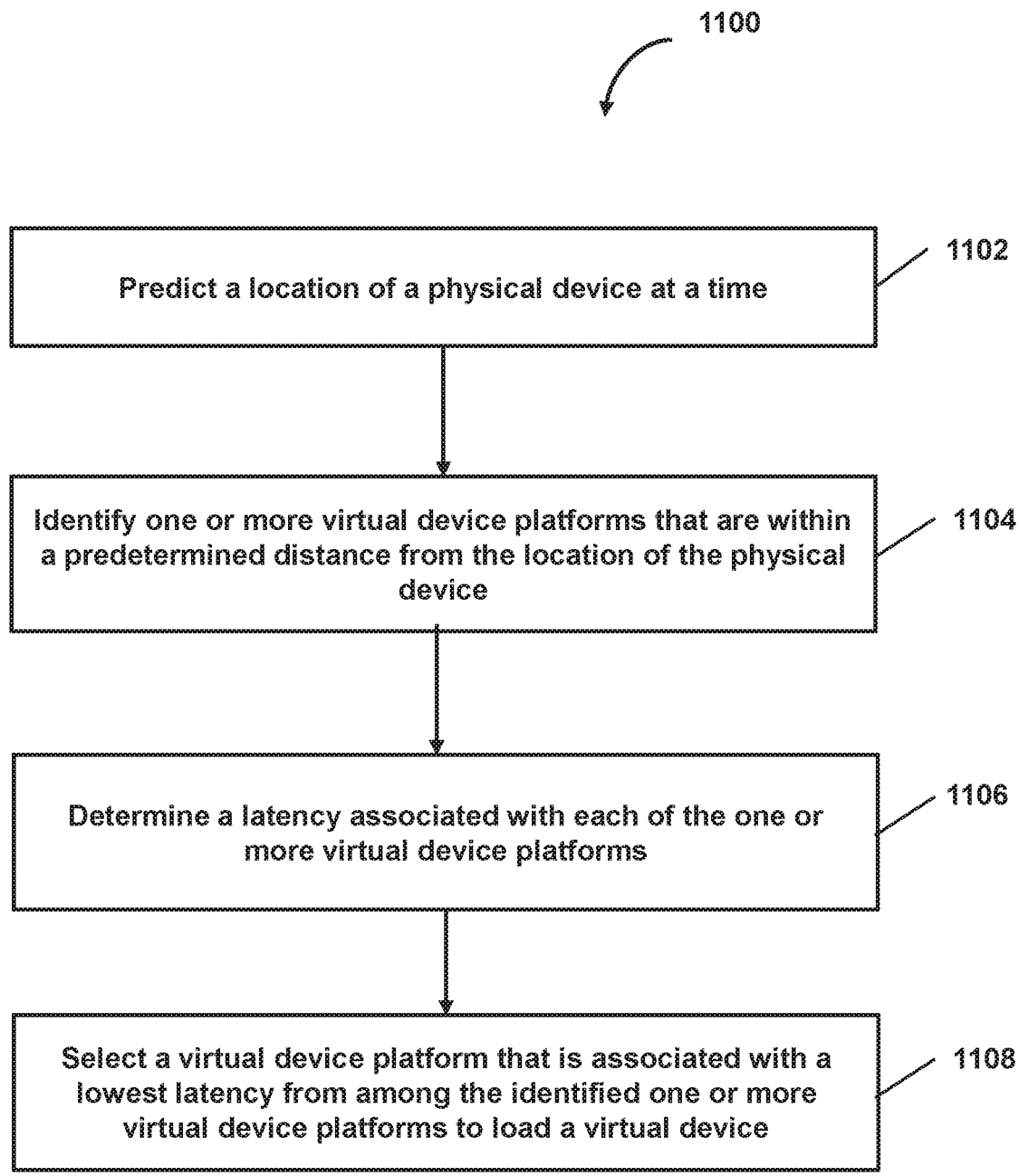
FIG. 11 shows a flowchart of a method for facilitating the prediction of a latency associated with a virtual device platform, in accordance with one or more embodiments.

FIG. 11 shows a flowchart of a method 1100 for facilitating prediction of a latency associated with a virtual device platform, in accordance with one or more embodiments. In an operation 1102, a location of a physical device at a particular time may be determined or predicted. For example, the location of the physical device may be determined or predicted based on historic connection data indicating locations from which the physical device has connected to virtual device platforms or has requested connection to virtual device platforms. In some embodiments, the historic connection data may be weighted when predicting the location of the physical device. In some embodiments, operation 1102 may be performed by a subsystem that is the same as or similar to prediction subsystem 114.

In an operation 1104, one or more virtual device platforms that are within a predetermined distance from the location of the physical device may be identified. In some embodiments, operation 1104 may be performed by a subsystem that is the same as or similar to prediction subsystem 114. In an operation 1106, a latency associated with each of the one or more virtual device platforms may be determined, inferred, or predicted. The latency may correspond to a network latency, processing latency, computational latency, and/or any other latency associated with the one or more virtual device platforms. In some embodiments, the prediction of the latency may be based on predicted processing loads, bandwidths, and other predicted data relating to the virtual device platform. In some embodiments, operation 1106 may be performed by a subsystem that is the same as or similar to prediction subsystem 114 or latency determination subsystem 118.

In an operation 1108, a virtual device platform that is associated with a lowest latency from among the identified one or more virtual device platforms may be selected to load a virtual device. In some embodiments, operation 1108 may be performed by a subsystem that is the same as or similar to latency determination subsystem 118.

In some embodiments, the various computers and subsystems illustrated in FIG. 1 may include one or more computing devices that are programmed to perform the functions described herein. The computing devices may include one or more electronic storages (e.g., memory 106, database(s) 132, or other electronic storages), one or more physical processors programmed with one or more computer program instructions, circuitry, or other components. The computing devices may include communication lines or ports to enable the exchange of information within a network (e.g., network 152) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 110-120, 140-144, or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 110-120 and 140-144 described herein is for illustrative purposes, and is not intended to be limiting, as any of subsystems 110-120 and 140-144 may provide more or less functionality than is described. For example, one or more of subsystems 110-120 and 140-144 may be eliminated, and some or all of its functionality may be provided by other ones of subsystems 110-120 and 140-144. As another example, additional subsystems may be programmed to perform some or all of the functionality attributed herein to one of subsystems 110-120 and 140-144.

Although the present disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the scope of the appended claims. For example, it is to be understood that the present disclosure contemplates that, to the extent possible, one or more features of any embodiment can be combined with one or more features of any other embodiment.

The present techniques will be better understood with reference to the following enumerated embodiments:

1. A method comprising: preloading a virtual device, such that the virtual device is partially loaded prior to a connection request from a client device; in response to the connection request from the client device, identifying a user associated with the client device; and loading the virtual device, (e.g., such that the loading of the virtual device is complete and is specific to the user of the client device).
2. The method of embodiment 1, further comprising retrieving user profile information associated with the user.
3. The method of any of embodiments 1-2, wherein the virtual device is loaded based on the user profile information associated with the user.
4. The method of any of embodiments 1-3, wherein the loading of the virtual device includes loading of a virtual device user interface, the method further comprising: sending, to the client device, information associated with the virtual device user interface of the virtual device, such that the client device presents the virtual device user interface.
5. The method of any of embodiments 1-4, wherein the connection request is in response to an interaction of a user with an application accessed via the client device.
6. The method of embodiment 5, wherein the application is accessed via a server or via the client device.
7. The method of any of embodiments 1-6, wherein preloading the virtual device comprises preloading the virtual device without using user profile information.
8. The method of any of embodiments 1-7, further comprising: detecting a disconnection of the client device; and in response to detecting the disconnection, rebooting the virtual device, such that the virtual device is partially loaded to a state prior to the connection request from the client device.
9. The method of any of embodiments 1-8, further comprising: in response to a second connection request from a second client device after the disconnection of the client device, identifying a second user associated with the second client device and retrieving second user profile information associated with the second user; and loading, based on the second user profile information associated with the second user, the virtual device, such that the loading of the virtual device is complete and is specific to the second user of the second client device.
10. A method comprising: predicting a time at which a client device will connect to a virtual device platform; retrieving user profile information of a user associated with the client device; and loading, based on the user profile information of the user, a virtual device specific to the user.
11. The method of embodiment 10, wherein the time is predicted based on a connection pattern associated with the client device.
12. The method of any of embodiments 10-11, wherein the loading of the virtual device is performed at a predetermined amount of time prior to the predicted time.
13. The method of any of embodiments 10-12, further comprising: in response to a connection request from the client device, causing the virtual device to be accessed by the client device.
14. The method of any of embodiments 10-13, retrieving device profile information associated with the client device; and loading, based on the device profile information associated with the client device, the virtual device specific to the user and the client device at the predetermined amount of time prior to the predicted second time.
15. The method of any of embodiments 10-14, wherein the connection pattern includes historic connection time information, the historic connection time information including times at which the client device connects to the virtual device platform, and wherein the time is predicted based on the historic connection time information.
16. The method of any of embodiments 10-15, further comprising: predicting a type of the client device that will connect to the virtual device platform; and wherein the loading of the virtual device is further based on the type of the client device, and wherein the virtual device is specific to the type of the client device.
17. The method of embodiment 16, wherein the type of the client device is predicted based on one or more types of client devices that connect to the virtual device platform.
18. The method of embodiment 17, wherein the one or more types of client devices comprise a desktop computer, a notebook computer, a tablet computer, a smartphone, or a wearable device.
19. The method of any of embodiments 10-18, wherein causing the virtual device to be accessed by the client device comprises causing a virtual device interface of the virtual device to be accessed by the client device.

20. The method of any of embodiments 10-19, wherein the virtual device is loaded based on the user profile information such that the loading of the first virtual device platform is complete.

21. A method comprising: determining a latency associated with each of a plurality of virtual device platforms; selecting, from among the plurality of virtual device platforms, a first virtual device platform for connecting to a client device, the first virtual device platform being selected based on the determined latencies; and causing, based on user profile information associated with a user of the client device, the first virtual device platform to load a virtual device associated with the client device.

22. The method of embodiment 21, further comprising: determining whether the first virtual device platform includes the user profile information associated with the user; and causing the user profile information to be transferred to the first virtual device platform based on the determination that the first virtual device platform does not include the user profile information.

23. The method of any of embodiments 21-22, further comprising predicting a location of the client device, and wherein the latency associated with each of the plurality of virtual device platforms is determined based on the predicted location of the client device.

24. The method of any of embodiments 21-23, further comprising identifying the plurality of virtual device platforms, such that a distance between each of the plurality of platforms and the client device is below a threshold.

25. The method of any of embodiments 21-24, further comprising, in response to determining that more than one virtual device platform includes the user profile information, selecting a second virtual device platform from among the more than one virtual device platform based on a latency associated with the second virtual device platform.

26. The method of any of embodiments 21-25, wherein determining the latency associated with each of the plurality of virtual device platforms comprises determining a processing delay in one or more servers associated with each of the plurality of virtual device platforms.

27. The method of any of embodiments 21-26, wherein determining the latency associated with each of the plurality of virtual device platforms comprises determining a delay in communication between the client device and each of the virtual device platforms.

28. The method of any of embodiments 21-27, wherein at least two of the plurality of virtual device platforms are located in a same geographical location.

29. The method of any of embodiments 21-28, wherein at least two of the plurality of virtual device platforms are located in different geographic locations.

30. A system, comprising: one or more processors; and memory storing instructions that when executed by the processors cause the processors to effectuate operations comprising those of any of embodiments 1-29.

31. A tangible, non-transitory, machine-readable medium storing instructions that when executed by a data processing apparatus cause the data processing apparatus to perform operations comprising those of any of embodiments 1-29.

What is claimed is:

1. A system for facilitating reduction in latency experienced by a user of a physical device by preloading plurality of virtual devices in anticipation of a connection request from the physical device, the system comprising:
 a virtual device platform including circuitry configured to:
  partially preload each of the plurality of virtual devices on the virtual device platform to a predetermined level associated with each of the plurality of virtual devices;
  begin a boot process for an operating system for each of the plurality of virtual devices on the virtual device platform, such that each of the plurality of virtual devices remains partially preloaded and partially booted prior to a connection request from a physical device;
  obtain, via a network, the connection request from the physical device;
  in response to the connection request, identify a user associated with the physical device and retrieve user profile information associated with the user;
  load, based on the user profile information associated with the user, a partially booted, partially preloaded first virtual device from the plurality of partially booted, partially preloaded virtual devices on the virtual device platform, such that the loading of the first virtual device is complete and is specific to the user of the physical device, the loading of the first virtual device including loading a first virtual device user interface specific to the user and, finish the process of booting the operating system for the first virtual device; and
  send, to the physical device, information associated with the first virtual device user interface of the first virtual device, such that the physical device presents the first virtual device user interface.

2. The system of claim 1, wherein the circuitry is further configured to:
 detect a disconnection of the physical device from the virtual device platform; and
 in response to the detected disconnection of the physical device, begin to reboot the first virtual device, such that the first virtual device is partially loaded and partially booted to a state prior to the connection request from the physical device.

3. The system of claim 2, wherein the circuitry is further configured to:
 in response to a new connection request from a new physical device, identify a new user associated with the new physical device and retrieve new user profile information associated with the new user; and
 load on the virtual device platform, based on the new user profile information associated with the new user, a second virtual device from the plurality of partially booted, partially preloaded virtual devices, such that the loading of the second virtual device is complete and is specific to the new user of the new physical device, the loading of the second virtual device including loading a new virtual device user interface specific to the new user and, finishing the process of booting the operating system for the second virtual device.

4. The system of claim 3, wherein the circuitry is further configured to send, to the new physical device, information associated with the second virtual device user interface of the second virtual device, such that the new physical device presents the second virtual device user interface.

5. The system of claim 2, wherein the circuitry is further configured to:
 in response to a new connection request from a new physical device, identify a new user associated with the new physical device and retrieve new user profile information associated with the new user; and load on the virtual device platform, based on the new user profile information associated with the new user, the first virtual device, such that the loading of the first virtual device is complete and is specific to the new user of the new physical device, the loading of the first virtual device including loading a new virtual device user interface specific to the new user and, finish the process of booting the operating system for the first virtual device.

6. The system of claim 1, wherein the circuitry is further configured to preload the plurality of virtual devices without using user profile information.

7. A method for facilitating reduction in latency experienced by a user of a physical device by preloading at least one virtual device in anticipation of a connection request from the physical device, the method comprising:
 partially preloading a virtual device on a virtual device platform to a predetermined level associated with the virtual device;
 beginning a boot process for an operating system of the virtual device on the virtual device platform, such that the virtual device is partially loaded and partially booted prior to a connection request from a client device;
 in response to the connection request from the client device, identifying a user associated with the client device and retrieving user profile information associated with the user; and
 loading on the virtual device platform, based on the user profile information associated with the user, the virtual device user and, finishing the process of booting the operating system for the virtual device, such that the loading and booting of the virtual device is complete and is specific to the user of the client device.

8. The method of claim 7, wherein the loading of the virtual device includes loading of a virtual device user interface, the method further comprising:
 sending, to the client device, information associated with the virtual device user interface of the virtual device, such that the client device presents the virtual device user interface.

9. The method of claim 7, wherein the connection request is in response to an interaction of a user with an application accessed via the client device.

10. The method of claim 9, wherein the application is accessed via a server or via the client device.

11. The method of claim 7, wherein preloading the virtual device comprises preloading the virtual device without using user profile information.

12. The method of claim 7, further comprising:
 detecting a disconnection of the client device; and
 in response to detecting the disconnection, begin rebooting the virtual device, such that the virtual device is partially loaded and partially booted to a state prior to the connection request from the client device.

13. The method of claim 12, further comprising:
 in response to a second connection request from a second client device after the disconnection of the client device, identifying a second user associated with the second client device and retrieving second user profile information associated with the second user; and
 loading on the virtual device platform, based on the second user profile information associated with the second user, the virtual device and, finishing the process of booting the operating system for the virtual device, such that the loading of the virtual device is complete and is specific to the second user of the second client device.

14. One or more non-transitory computer-readable media comprising instructions that, when executed by one or more processors, cause operations comprising:
 partially preloading a virtual device on a virtual device platform to a predetermined level associated with the virtual device;
 beginning a boot process for an operating system of the virtual device on the virtual device platform, such that the virtual device is partially loaded and partially booted prior to a connection request from a client device;
 in response to the connection request from the client device, identifying a user associated with the client device and retrieving user profile information associated with the user; and
 loading on the virtual device platform, based on the user profile information associated with the user, the virtual device user and, finishing the process of booting the operating system for the virtual device, such that the loading and booting of the virtual device is complete and is specific to the user of the client device.

15. The media of claim 14, wherein the loading of the virtual device includes loading of a virtual device user interface, the media further comprising:
 sending, to the client device, information associated with the virtual device user interface of the virtual device, such that the client device presents the virtual device user interface.

16. The media of claim 14, wherein the connection request is in response to an interaction of a user with an application accessed via the client device.

17. The media of claim 16, wherein the application is accessed via a server or via the client device.

18. The media of claim 14, wherein preloading the virtual device comprises preloading the virtual device without using user profile information.

19. The media of claim 14, further comprising:
 detecting a disconnection of the client device; and
 in response to detecting the disconnection, begin rebooting the virtual device, such that the virtual device is partially loaded and partially booted to a state prior to the connection request from the client device.

20. The media of claim 19, further comprising:
 in response to a second connection request from a second client device after the disconnection of the client device, identifying a second user associated with the second client device and retrieving second user profile information associated with the second user; and
 loading on the virtual device platform, based on the second user profile information associated with the second user, the virtual device user and, finishing the process of booting the operating system for the virtual device, such that the loading of the virtual device is complete and is specific to the second user of the second client device.

* * * * *